United States Patent
Juppe et al.

(10) Patent No.: US 11,676,406 B2
(45) Date of Patent: Jun. 13, 2023

(54) SYSTEM AND METHOD OF AUGMENTING A THREE-DIMENSIONAL OBJECTS TRAINING DATASET

(71) Applicant: APPLICATIONS MOBILES OVERVIEW INC., Montreal (CA)

(72) Inventors: Laurent Juppe, Montreal (CA); Sherif Esmat Omar Abuelwafa, Montreal (CA); Bryan Allen Martin, Montreal (CA)

(73) Assignee: APPLICATIONS MOBILES OVERVIEW INC., Montreal (CA)

( * ) Notice: Subject to any disclaimer, the term of this patent is extended or adjusted under 35 U.S.C. 154(b) by 30 days.

(21) Appl. No.: 17/322,471

(22) Filed: May 17, 2021

(65) Prior Publication Data
US 2021/0366205 A1    Nov. 25, 2021

Related U.S. Application Data

(60) Provisional application No. 63/027,875, filed on May 20, 2020.

(51) Int. Cl.
*G06V 20/00*    (2022.01)
*G06V 20/64*    (2022.01)
(Continued)

(52) U.S. Cl.
CPC ............ *G06V 20/64* (2022.01); *G06F 18/214* (2023.01); *G06N 3/04* (2013.01); *G06N 20/00* (2019.01);
(Continued)

(58) Field of Classification Search
None
See application file for complete search history.

(56) References Cited

U.S. PATENT DOCUMENTS

| 7,457,801 B2 | 11/2008 | Liu et al. |
| 8,270,770 B1 | 9/2012 | Jin et al. |

(Continued)

FOREIGN PATENT DOCUMENTS

| CN | 109948514 A | 6/2019 |
| CN | 110020681 A | 7/2019 |

OTHER PUBLICATIONS

English Translation for CN110020681 retrieved on Espacenet on May 12, 2021.
(Continued)

*Primary Examiner* — Martin Mushambo
(74) *Attorney, Agent, or Firm* — BCF LLP

(57) ABSTRACT

A 3D objects training dataset is augmented by accessing a 3D point cloud representation of an object and by applying an augmentation routine on the point cloud to generate an augmented point cloud. The augmentation routine comprises randomly selecting an execution order of at least one of (i) adding a noise to the point cloud, (ii) applying a geometric transformation on the point cloud and (iii) applying a degradation on the point cloud. The randomly selected execution order of these operations on the point cloud is applied, and the augmented point cloud is added to the objects training dataset. A machine learning algorithm (MLA) is trained by inputting the 3D point cloud representation to generate an output, comparing the output with an expected label associated with the point cloud representation to determine a measure of error on the output, and iteratively adjusting various weights associated with nodes of the MLA.

23 Claims, 29 Drawing Sheets

(51) Int. Cl.
   *G06T 19/20* (2011.01)
   *G06N 20/00* (2019.01)
   *G06T 5/00* (2006.01)
   *G06T 19/00* (2011.01)
   *G06N 3/04* (2023.01)
   *G06T 5/50* (2006.01)
   *G06F 18/214* (2023.01)
   *G06V 10/774* (2022.01)

(52) U.S. Cl.
   CPC ............ *G06T 5/003* (2013.01); *G06T 5/50* (2013.01); *G06T 19/006* (2013.01); *G06T 19/20* (2013.01); *G06V 10/774* (2022.01); *G06T 2207/10028* (2013.01); *G06T 2219/2016* (2013.01)

(56) References Cited

U.S. PATENT DOCUMENTS

| | | | |
|---|---|---|---|
| 8,903,167 | B2 | 12/2014 | Kohli et al. |
| 9,369,689 | B1* | 6/2016 | Tran ............... H04N 13/239 |
| 9,609,307 | B1 | 3/2017 | Lopez et al. |
| 9,870,436 | B2 | 1/2018 | Lorono et al. |
| 9,946,732 | B2 | 4/2018 | Maranzana et al. |
| 10,185,880 | B2 | 1/2019 | Viswanathan et al. |
| 10,346,721 | B2 | 7/2019 | Albright et al. |
| 10,489,683 | B1 | 11/2019 | Koh et al. |
| 10,529,137 | B1 | 1/2020 | Black et al. |
| 10,878,285 | B2 | 12/2020 | Ahmed et al. |
| 10,977,481 | B2 | 4/2021 | Meany et al. |
| 11,010,593 | B2 | 5/2021 | Maranzana et al. |
| 2015/0379422 | A1 | 12/2015 | Chandler |
| 2018/0322309 | A1 | 11/2018 | Matejka et al. |
| 2019/0065933 | A1 | 2/2019 | Bogdoll et al. |
| 2019/0108639 | A1 | 4/2019 | Tchapmi et al. |
| 2019/0122378 | A1 | 4/2019 | Aswin |
| 2019/0138941 | A1 | 5/2019 | Kam et al. |
| 2019/0251397 | A1 | 8/2019 | Tremblay et al. |
| 2019/0294961 | A1 | 9/2019 | Zuev et al. |
| 2019/0311254 | A1 | 10/2019 | Furek et al. |
| 2019/0311487 | A1 | 10/2019 | Xiao et al. |
| 2020/0020118 | A1 | 1/2020 | Chapdelaine-Couture et al. |
| 2020/0043186 | A1 | 2/2020 | Selviah et al. |
| 2020/0110994 | A1 | 4/2020 | Goto et al. |
| 2020/0160616 | A1 | 5/2020 | Li et al. |
| 2020/0231109 | A1 | 7/2020 | Baltaxe et al. |
| 2021/0158607 | A1 | 5/2021 | Katzman et al. |

OTHER PUBLICATIONS

English Translation for CN109948514 retrieved on Espacenet on May 12, 2021.
International Search Report with regard to the counterpart International Patent Application No. PCT/IB2021/054374 dated Aug. 26, 2021.
Qi al., "PointNet: Deep Learning on Point Sets for 3D Classification and Segmentation", arXiv:1612.00593v2 [cs.CV] Apr. 10, 2017, pp. 1-19.
Roy et al., "Effects of Degradations on Deep Neural Network Architectures", arXiv:1807.10108v4 [cs.CV] Jun. 26, 2019, pp. 1-11.
Dodge et al., "Understanding How Image Quality Affects Deep Neural Networks", arXiv:1604.04004v2 [cs.CV] Apr. 21, 2016, 6 pages.

* cited by examiner

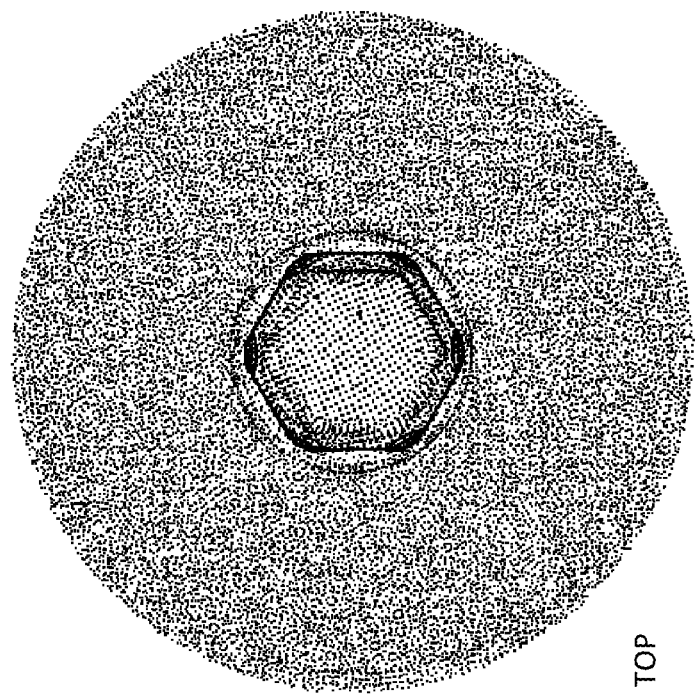
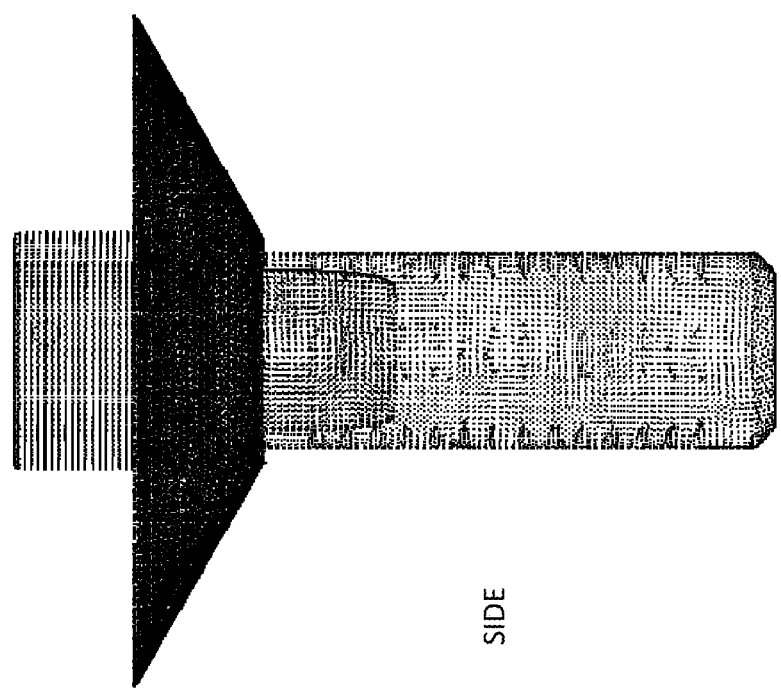
Figure 5

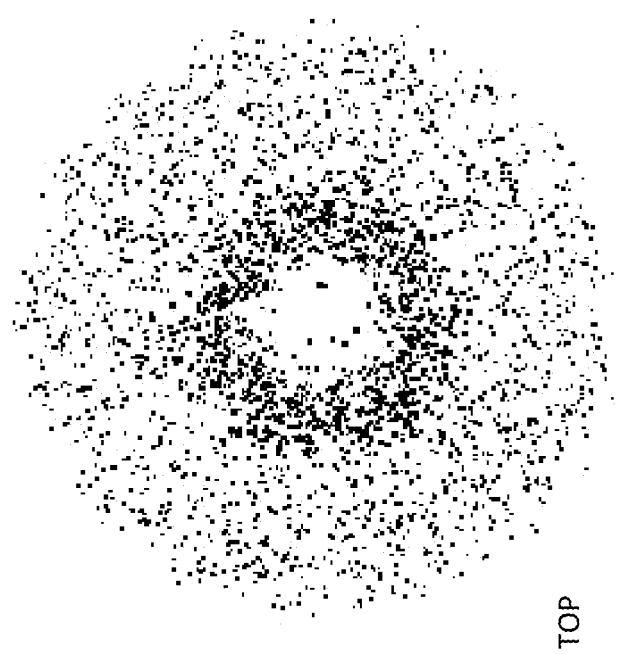
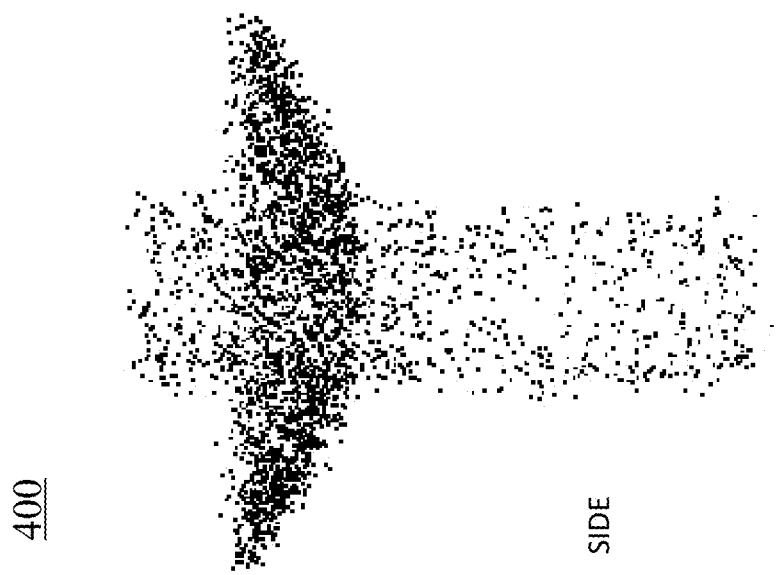
Figure 6

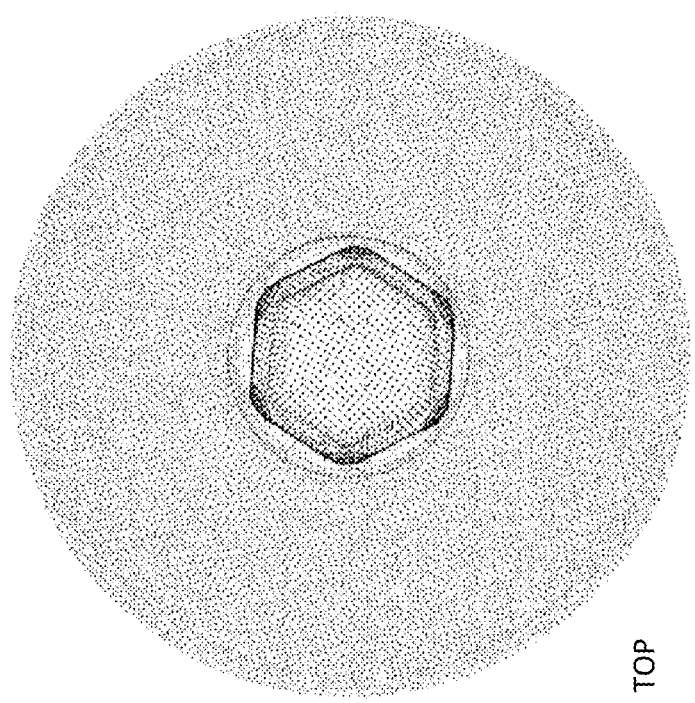
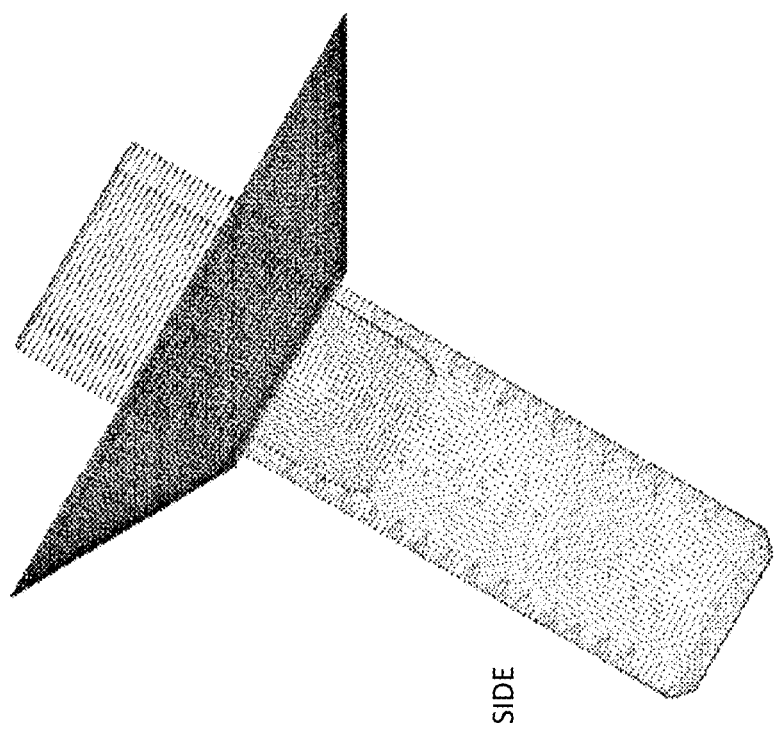
TOP
SIDE
550
Figure 8

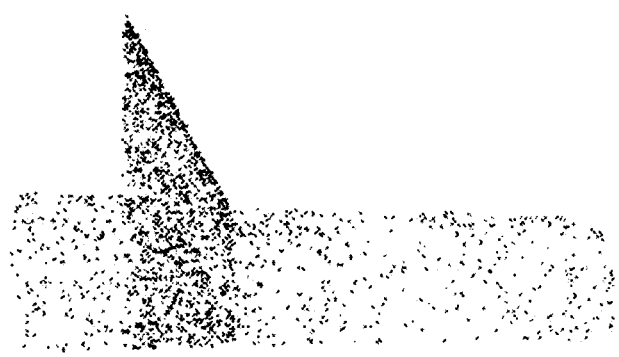
Figure 10

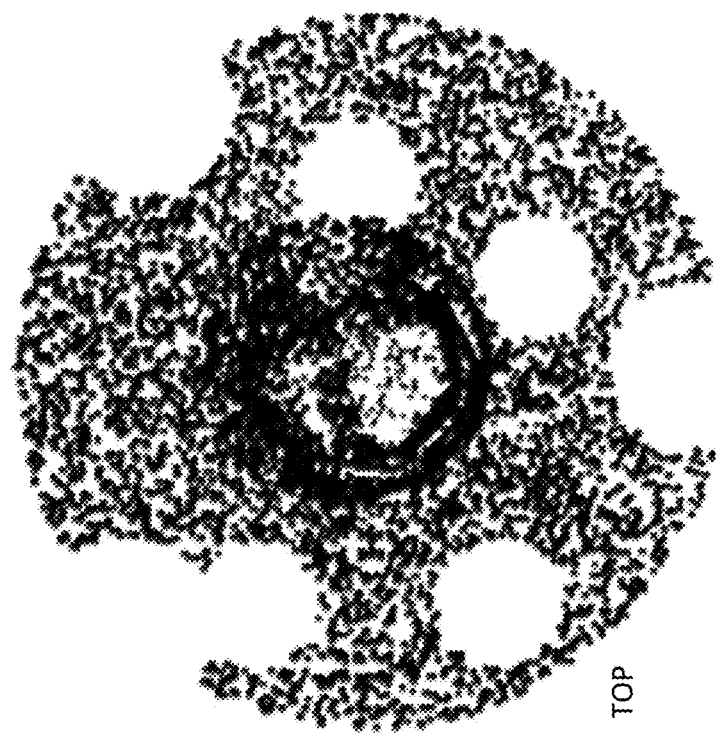
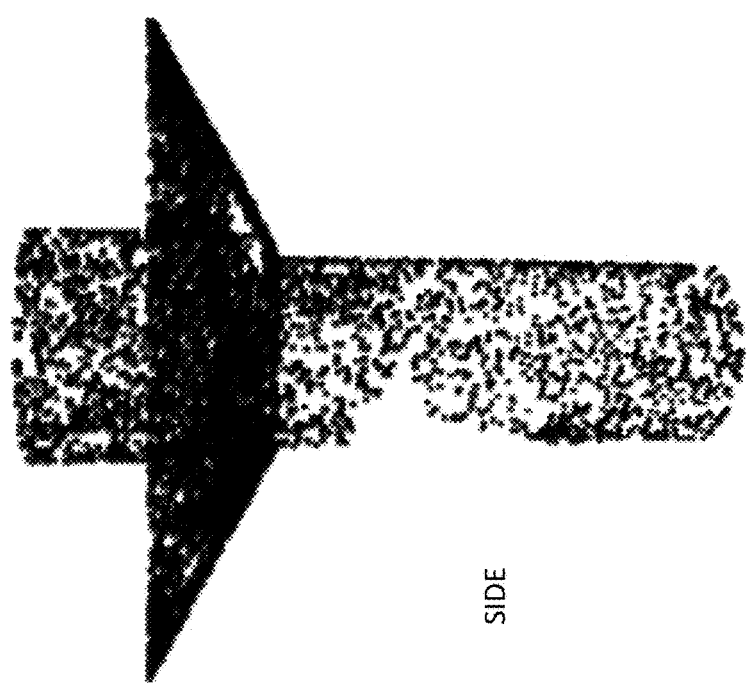
Figure 11

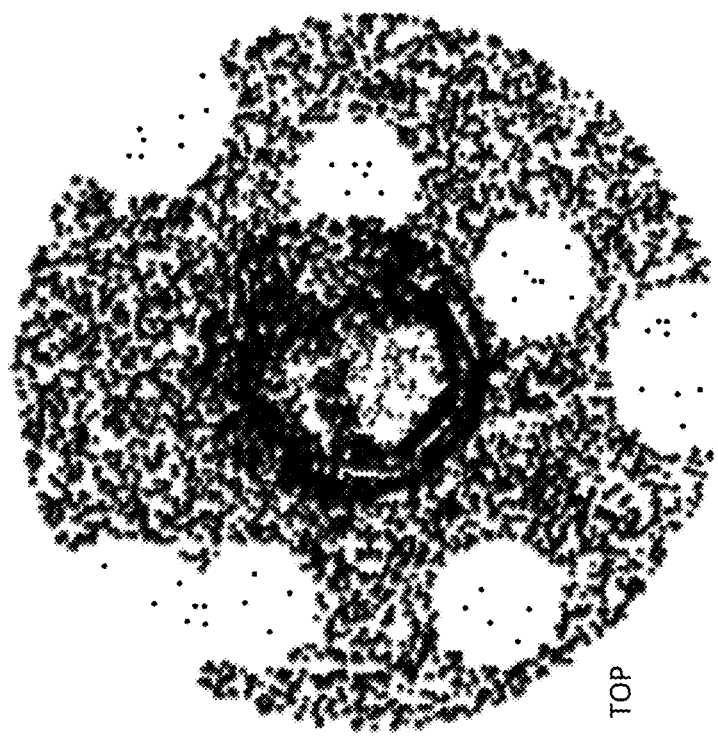
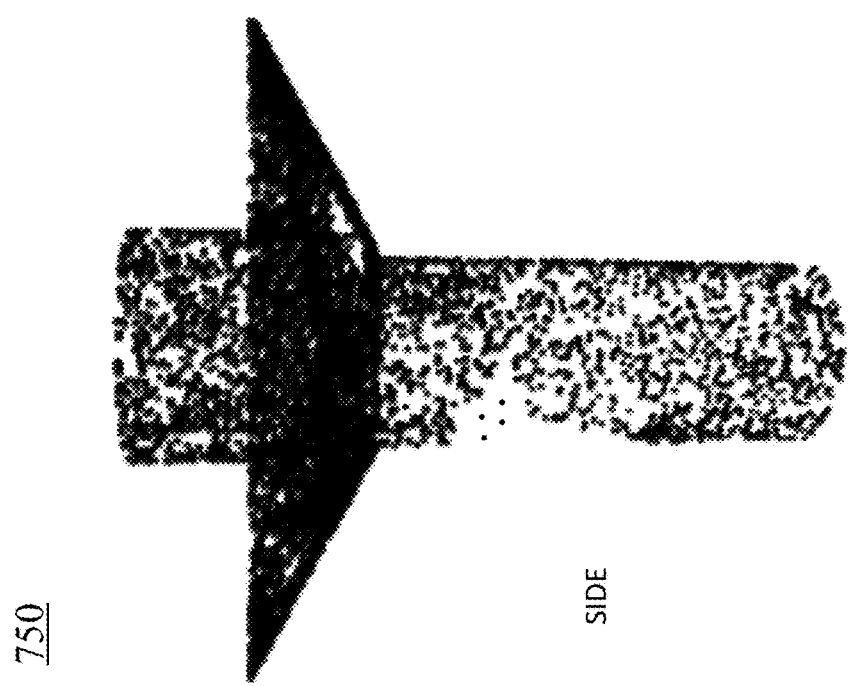
Figure 12

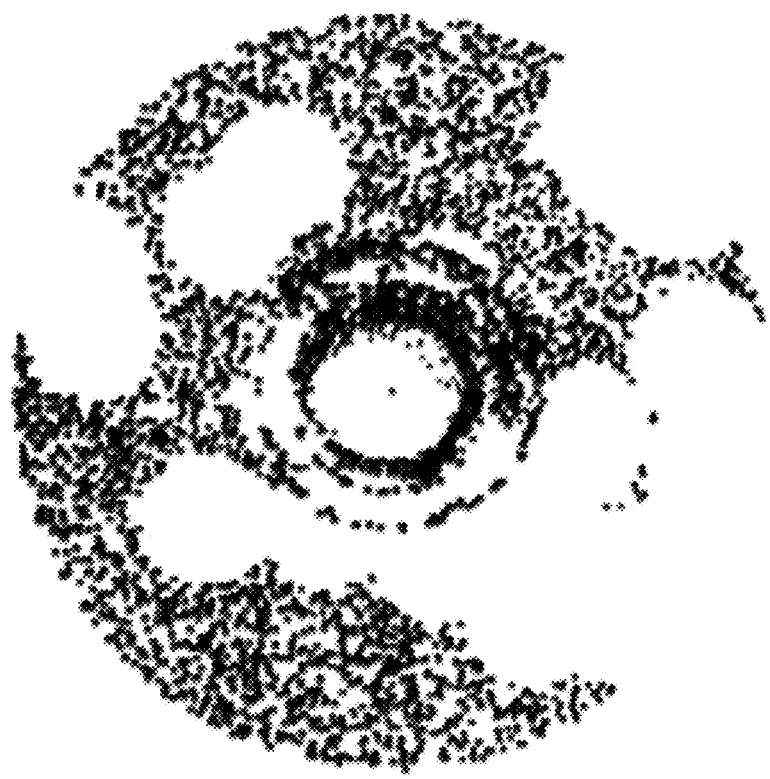
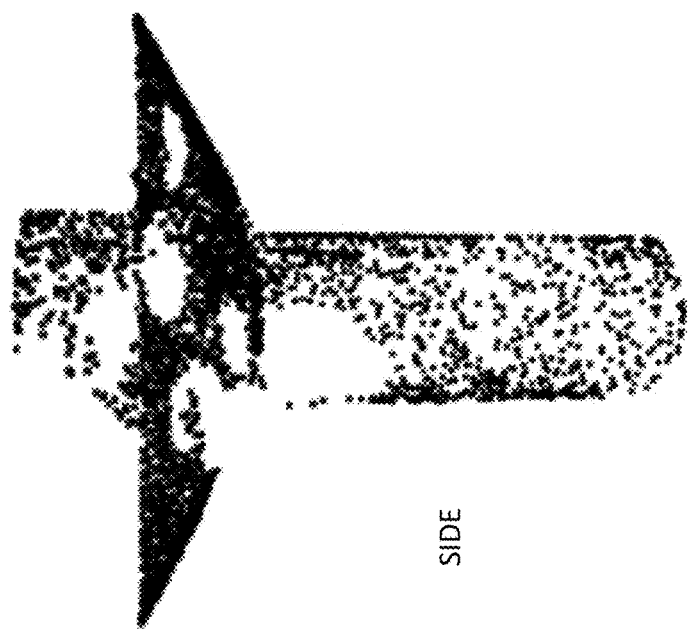
Figure 13

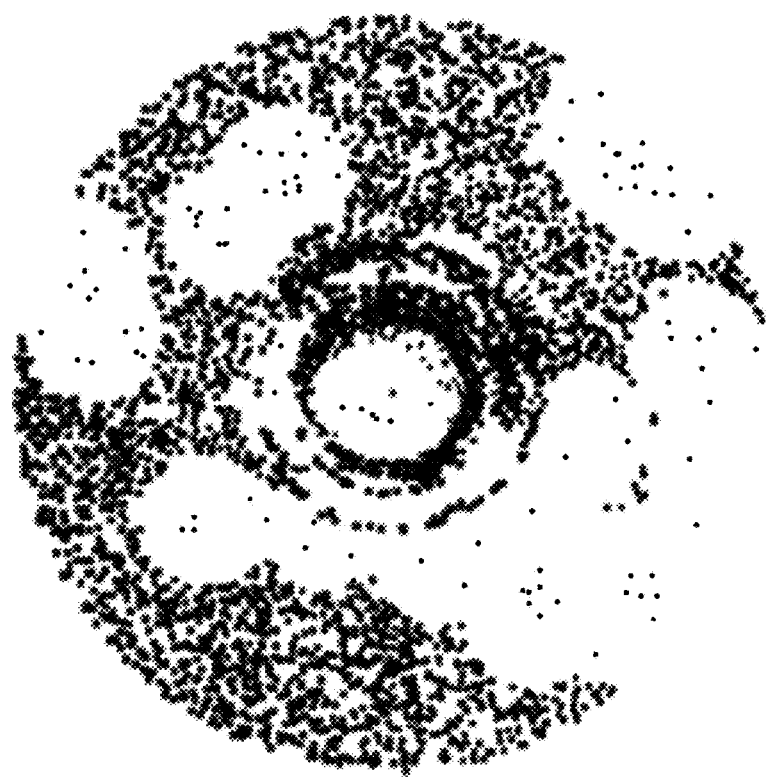
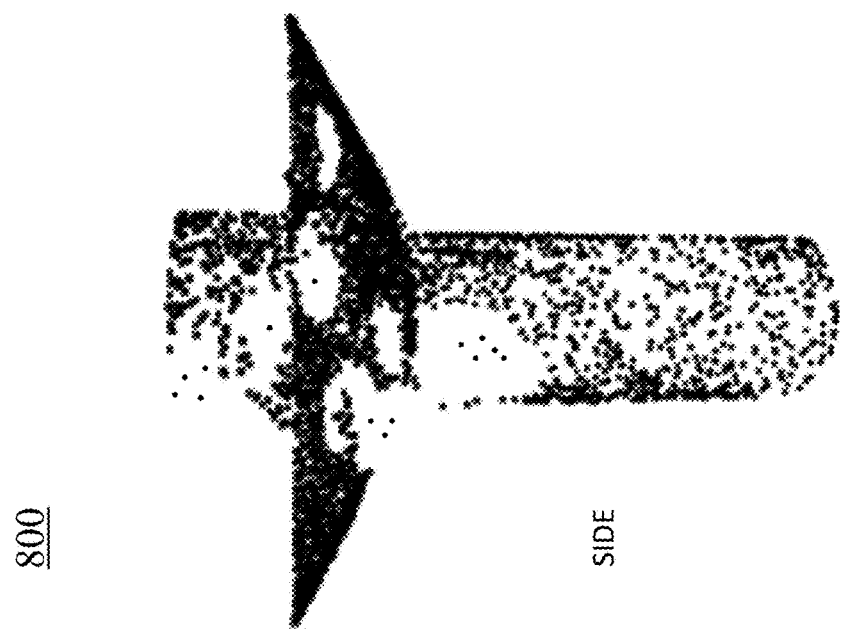
Figure 14

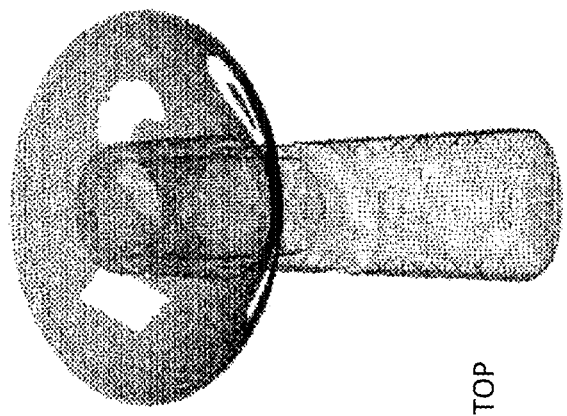
TOP
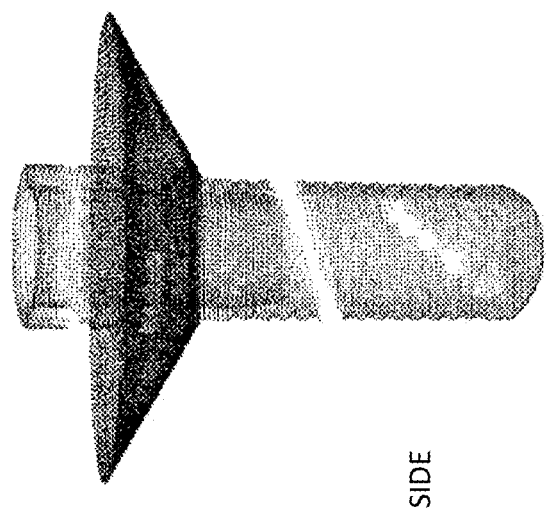
850
SIDE
Figure 15

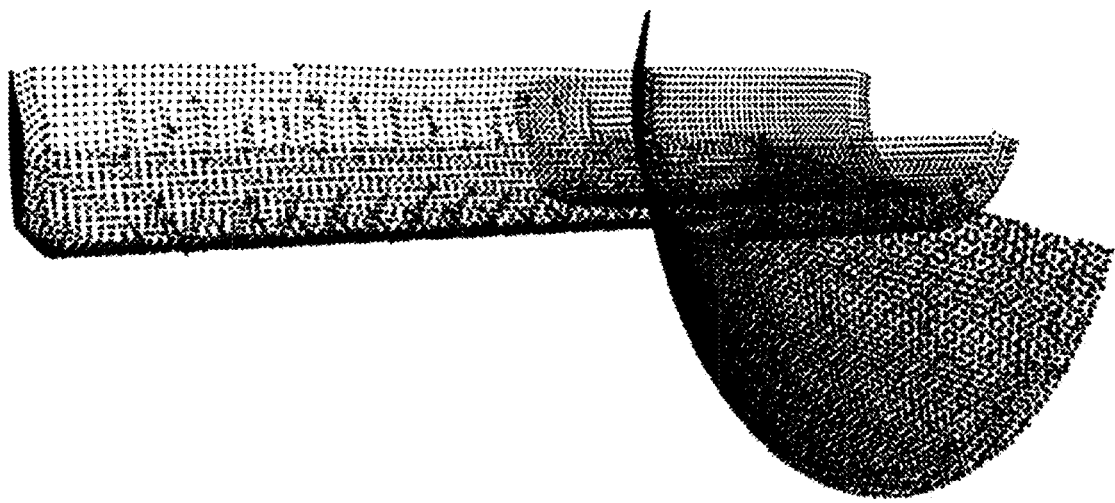
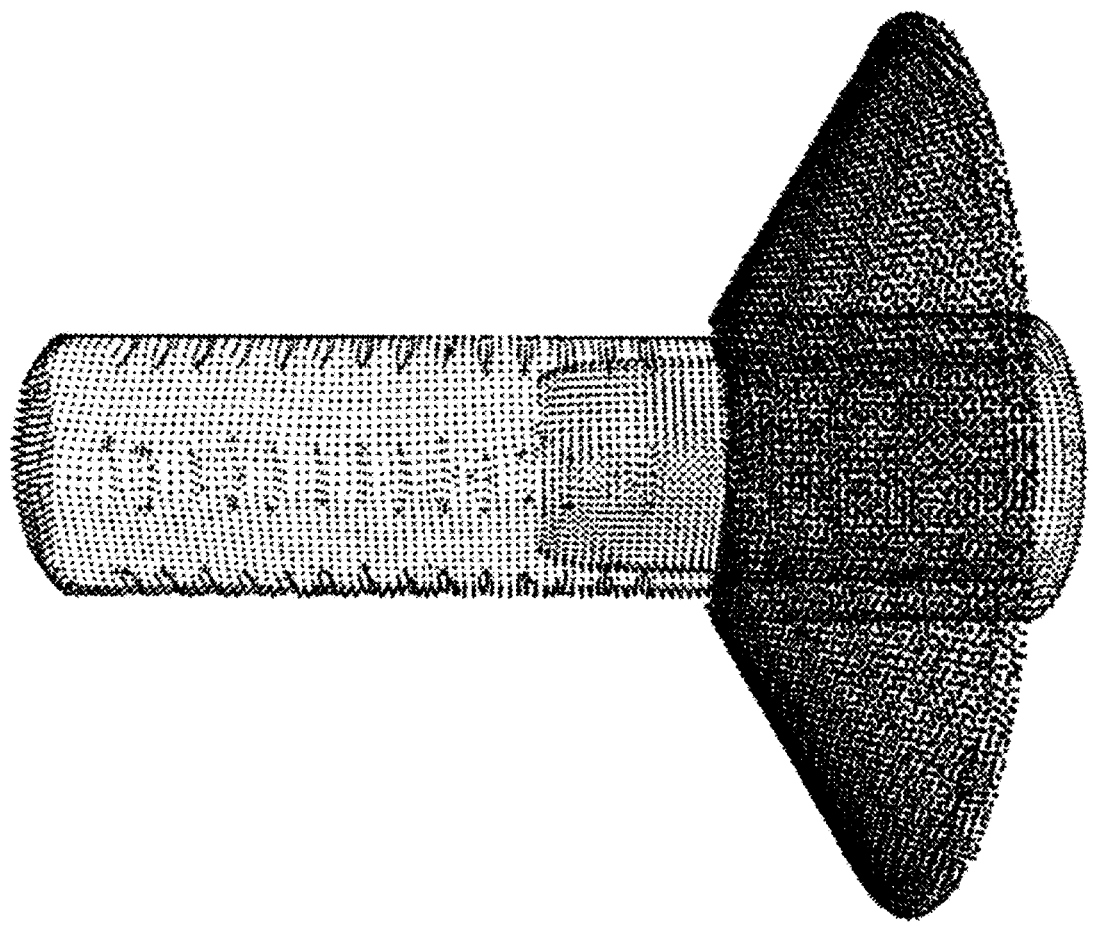
Figure 20

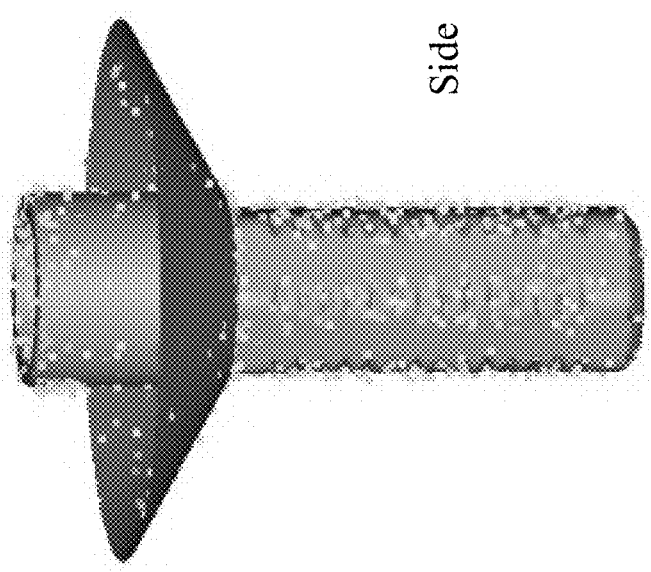
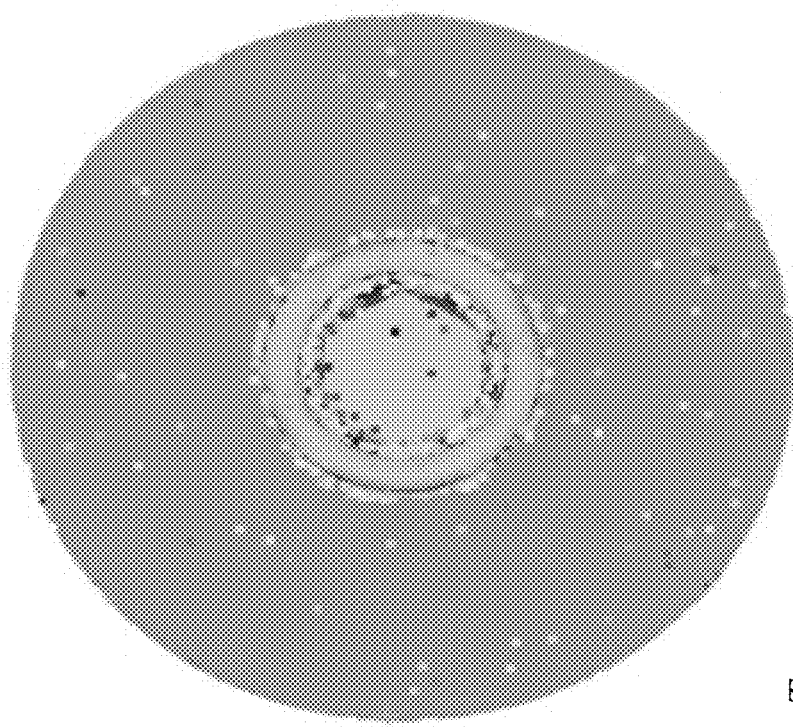
Figure 26

SYSTEM AND METHOD OF AUGMENTING A THREE-DIMENSIONAL OBJECTS TRAINING DATASET

CROSS-REFERENCE

The present application claims priority from U.S. Provisional Patent Application Ser. No. 63/027,875, filed on May 20, 2020, the disclosure of which is incorporated by reference herein in its entirety.

FIELD

The present technology relates to systems and methods of augmenting a three-dimensional (3D) objects training dataset.

BACKGROUND

Creating and augmenting a 3D objects training dataset based on a small number of models is a difficult task. Conventional solutions are not cost-efficient and require specialized, cumbersome and costly techniques in terms of hardware requirement and software complexity.

Even though the recent developments identified above may provide benefits, improvements are still desirable.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY

Embodiments of the present technology have been developed based on developers' appreciation of shortcomings associated with the prior art.

In a first aspect, various implementations of the present technology provide a method of augmenting a three-dimensional (3D) objects training dataset, the method comprising: accessing a 3D point cloud representation of a 3D object; applying an augmentation routine on the 3D point cloud to generate an augmented 3D point cloud, the augmentation routine comprising: randomly selecting an execution order of at least one of (i) adding a noise to the 3D point cloud, (ii) applying a geometric transformation on the 3D point cloud and (iii) applying a degradation on the 3D point cloud; applying the randomly selected execution order of operations (i) to (iii) on the 3D point cloud; and adding the augmented 3D point cloud to the 3D objects training dataset.

In some implementations of the present technology, accessing the 3D point cloud representation of the 3D object comprises generating the 3D point cloud representation from a 3D representation of the 3D object.

In some implementations of the present technology, the operation (i) comprises constraining the noise so that the perturbation associated with the augmented 3D point cloud is within a finite envelope.

In some implementations of the present technology, the at least one of the operations (i) to (iii) are applied based on a random parameter.

In some implementations of the present technology, the noise is selected from a White Gaussian noise, a Voroni noise, a Fractal noise, a Salt and Pepper noise, a film grain noise, a fixed-pattern noise, a Perlin noise, a simplex noise, a Poisson noise and a combination thereof.

In some implementations of the present technology, the operation (ii) of applying the geometric transformation on the 3D point cloud comprises an operation selected from: changing a size of the 3D point cloud, applying a rotation to the 3D point cloud, applying shifting and/or translating to the 3D point cloud, applying a rotation to articulations of the 3D point cloud, applying a scale-agnostic transformation matrix operations to the 3D point cloud, applying a reflection to the 3D point cloud, applying a tessellation to the 3D point cloud and a combination thereof.

In some implementations of the present technology, the operation (iii) of applying the degradation comprises removing a group of points from the 3D point cloud.

In some implementations of the present technology, the method further comprises creating fragments by removing hidden 3D points considering a given 3D point of view to the 3D point cloud.

In some implementations of the present technology, the operation (iii) of applying the degradation comprises creating random holes in the 3D point cloud.

In some implementations of the present technology, the method further comprises changing a size of the random holes in the 3D point cloud.

In some implementations of the present technology, the method further comprises changing a position of the random holes in the 3D point cloud.

In some implementations of the present technology, the method further comprises changing a 3D points density of the random holes in the 3D point cloud.

In some implementations of the present technology, the 3D point cloud representation of the 3D object is a first 3D point cloud representation of a first 3D object and the augmented 3D point cloud is a first augmented 3D point cloud, the method further comprising: accessing a second 3D point cloud representation of a second 3D object; applying an augmentation routine on the second 3D point cloud to generate a second augmented 3D point cloud; synthesizing a scene comprising the first augmented 3D point cloud and the second augmented 3D point cloud; and adding the synthesized scene to the 3D objects training dataset.

In some implementations of the present technology, the method further comprises training a machine learning algorithm (MLA) based at least in part on the 3D objects training dataset.

In some implementations of the present technology, the method further comprises applying the MLA on non-synthetic data, the non-synthetic data comprising at least one non-synthetic 3D object.

In some implementations of the present technology, applying the MLA comprises: segmenting the non-synthetic data to generate a boundary box around the at least one non-synthetic 3D object; and classifying the at least one non-synthetic 3D object based at least in part on the 3D objects training dataset.

In some implementations of the present technology, the method further comprises applying a loopback routine to further train the MLA based on the classification of the at least one non-synthetic 3D object.

In some implementations of the present technology, the loopback routine comprises controlling the operation (iii) of applying the degradation on the 3D point cloud, the controlling being based on the non-synthetic 3D object.

In some implementations of the present technology, the controlling is based on a determination of a missing portion of the non-synthetic 3D object.

In some implementations of the present technology, the loopback mechanism is utilized to determine specific parameters according to which the augmentation routine is applied.

In a second aspect, various implementations of the present technology provide a method of training a machine learning algorithm (MLA), the method comprising: accessing a 3D point cloud representation associated with a 3D object from an augmented 3D objects training dataset, wherein: the augmented 3D objects training dataset has been generated by: accessing the 3D point cloud representation of the 3D object; applying an augmentation routine on the 3D point cloud to generate an augmented 3D point cloud, the augmentation routine comprising: randomly selecting an execution order of at least one of (i) adding a noise to the 3D point cloud, (ii) applying a geometric transformation on the 3D point cloud and (iii) applying a degradation on the 3D point cloud; applying the randomly selected execution order of operations (i) to (iii) on the 3D point cloud; and adding the augmented 3D point cloud to the augmented 3D objects training dataset; inputting the 3D point cloud representation to the MLA to generate an output; comparing the output of the MLA with an expected label associated with the 3D point cloud representation to determine a measure of error on the output of the MLA; and iteratively adjusting various weights associated with nodes of the MLA.

In some implementations of the present technology, the weights associated with nodes of the MLA are adjusted until the measure of error is below a threshold value.

In some implementations of the present technology, the weights associated with nodes of the MLA are adjusted for a predetermined number of iterations.

In third further aspect, various implementations of the present technology provide a computer-implemented system configured to perform the method of augmenting a three-dimensional (3D) objects training dataset.

In a fourth aspect, various implementations of the present technology provide a computer-implemented system configured to perform the method of training a machine learning algorithm (MLA).

In a fifth aspect, various implementations of the present technology provide a non-transitory computer-readable medium comprising computer-executable instructions that cause a system to execute the method of augmenting a three-dimensional (3D) objects training dataset.

In a sixth aspect, various implementations of the present technology provide a non-transitory computer-readable medium comprising computer-executable instructions that cause a system to execute the method of training a machine learning algorithm (MLA).

In the context of the present specification, unless expressly provided otherwise, a computer system may refer, but is not limited to, an "electronic device", an "operation system", a "system", a "computer-based system", a "controller unit", a "monitoring device", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

FIG. 5 illustrates a representative side view and top view associated with a 3D point cloud representation of a 3D object, in accordance with various embodiments of the present technology;

FIG. 6 illustrates a representative augmented 3D point cloud representation of the 3D object, in accordance with various embodiments of the present technology;

FIGS. 7-9 illustrate representative geometrically transformed 3D point cloud representations of the 3D object, in accordance with various embodiments of the present technology;

FIGS. 10-15 illustrate representative degraded 3D point cloud representations of the 3D object, in accordance with various embodiments of the present technology;

FIG. 20 illustrates partial point clouds termed 3D fragments in accordance with various embodiments of the present technology;

FIGS. 24-27 illustrate a non-limiting example of loopback routine associated with a degradation module, in accordance with various embodiments of the present disclosure;

Figure 1:
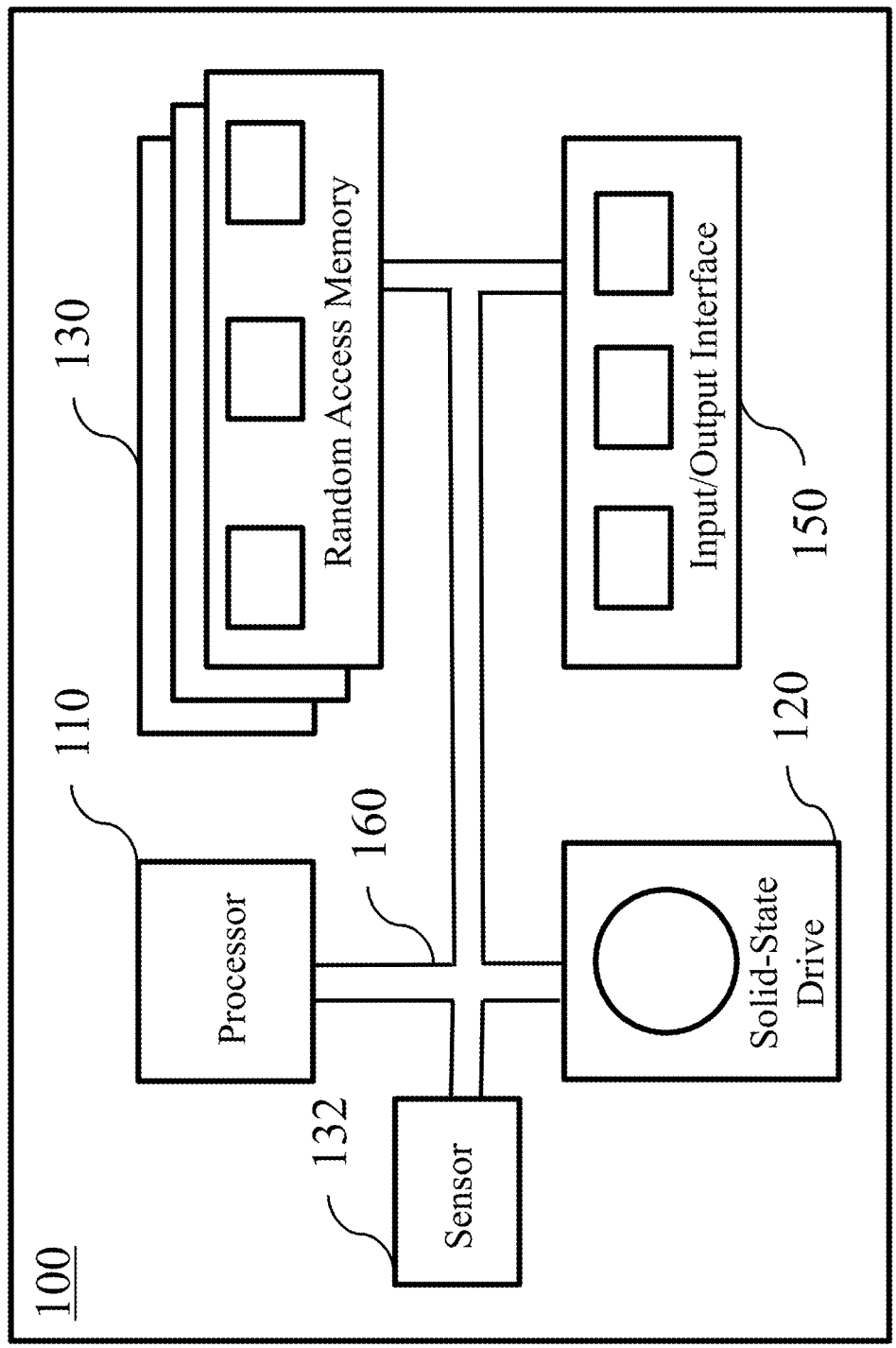
FIG. 1 is an illustration of a representative environment for executing a method of augmenting a three-dimensional (3D) objects training dataset, in accordance with various embodiments of the present technology.

It should be noted that the various drawings are not to scale.

DETAILED DESCRIPTION OF THE DRAWINGS

Various representative embodiments of the described technology will be described more fully hereinafter with reference to the accompanying drawings, in which representative embodiments are shown. The present technology concept may, however, be embodied in many different forms and should not be construed as limited to the representative embodiments set forth herein. Rather, these representative embodiments are provided so that the disclosure will be thorough and complete, and will fully convey the scope of the present technology to those skilled in the art. In the drawings, the sizes and relative sizes of layers and regions may be exaggerated for clarity. Like numerals refer to like elements throughout.

It will be understood that, although the terms first, second, third, etc. may be used herein to describe various elements, these elements should not be limited by these terms. These terms are used to distinguish one element from another. Thus, a first element discussed below could be termed a second element without departing from the teachings of the present technology. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is only intended to describe particular representative embodiments and is not intended to be limiting of the present technology. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process operations and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

In the context of the present technology, a "3D representation of a 3D object" may refer to a digital 3D model of this object under the form of a digital file or a digital group of files that describe the 3D geometry of an object. The description of an object's 3D geometry is given in terms of a collection of points in a 3D space (hereafter called "vertices", singular: "vertex"), those vertices being connected or not by various geometry entities such as triangle lines, planar or curved surfaces, etc. 3D models may be created by hand, algorithmically or scanned. The formats of those digital files are numerous and the technology is compatible to the most common ones.

In the context of the present technology, a "3D point cloud" may refer to a simple 3D representation of an object were the vertices are not necessarily connected to each other. If they are not connected to each other, the basic information contained in this kind of representation is the coordinates (e.g., x, y, z in the case of a Cartesian coordinate system) of each vertex. Other information may be contained, such as vertices color (e.g., r,g,b in the case of an RGB color space). 3D point cloud is the simplest representation of a 3D object and the present embodiments are compatible with 3D point clouds. The 3D point cloud is often used as the result of a 3D scanning and a very common format for those files is the Polygon File Format (PLY).

In the context of the present technology, a "non-synthetic object" may refer to any object in the real-world. Non-synthetic objects are not synthesized using any computer rendering techniques rather are scanned, captured by any non-limiting means such as using suitable sensor, such as camera, optical sensor, depth sensor or the like, to generate or reconstruct 3D point cloud representation of the non-synthetic 3D object using any "off the shelf" technique, including but not limited to photogrammetry, machine learning based techniques, depth maps or the like. Certain non-limiting examples of a non-synthetic 3D object may be any real-world objects such as a computer screen, a table, a chair, a coffee mug or a mechanical component on an assembly line, any type of inanimate object or even any type of animal, a plant.

The present disclosure illustrates embodiments of the technology focusing on augmenting a 3D objects training dataset. Such machine learning techniques typically require a large volume of training data to properly train the machine learning algorithms (MLAs). In one context, the MLA may be a 3D objects classifier aiming at identifying 3D objects based on 3D point cloud representations of a scanned object. In order to provide sufficient reliability, the MLAs have to be trained on a large database of 3D point cloud representations of objects, also referred to as 3D objects training dataset.

The problem addressed by the present technology relates to the creation and augmentation of 3D objects training dataset so that the 3D objects training dataset contains a large enough number of entries from a small number of models (e.g., one model per "class", a "class" being a given object) to ensure proper training of the MLAs. In so doing, the present technology may therefore provide a cost-efficient approach to the creation of the 3D objects training dataset having a large enough number of entries using the 3D objects training dataset with a small number of initial entries which would have otherwise required specialized, cumbersome and costly techniques in terms of hardware requirement and software complexity.

It will be appreciated that 3D point cloud representation has several benefits over 2D representation of any object. Such benefits include but are not limited to:

(1) 3D point cloud representation has better denoising and/or segmentation capabilities as compared to 2D representations; and/or
(2) 3D point cloud representation provides flexibility in terms of working on purely geometrical features; and/or
(3) 3D point cloud representation is generally independent of background, lightning, depth of field, motion blur, and/or other purely 2D features; and/or
(4) 3D point cloud representation has better performance over 2D representation various in tasks (e.g., classification, recognition, detection, segmentation, etc.) where many objects with different sizes, but the same shape need to be processed (i.e., classified, recognized, etc.); and/or
(5) Several 3D based machine learning algorithms are based on 3D features (e.g., dimensions, normals, scale, etc.). Such features well describe the processed objects in many real-world applications. 2D representation lacks features lack such quality; and/or
(6) 3D point cloud representation of an object allows a 360° access and provides detailed information about the 3D geometry of objects which cannot be captured with 2D representation.

With these fundamentals in place, we will now consider some non-limiting examples to illustrate various implementations of aspects of the present technology.

FIG. 1 illustrates a diagram of a computing environment 100 in accordance with an embodiment of the present technology is shown. In some embodiments, the computing environment 100 may be implemented by any of a conventional personal computer, a computer dedicated to operating generation of 3D representation of objects, a remote server and/or an electronic device (such as, but not limited to, a mobile device, a tablet device, a server, a controller unit, a control device, a monitoring device, etc.) and/or any combination thereof appropriate to the relevant task at hand. In some embodiments, the computing environment 100 comprises various hardware components including one or more single or multi-core processors collectively represented by a processor 110, a solid-state drive 120, a random access memory 130, a sensor 132 and an input/output interface 150.

The computing environment 100 may be a computer specifically designed for a generation of 3D representation of objects. Further, the computing environment 100 may generate 3D point cloud from the 3D representation objects. In some alternative embodiments, the computing environment 100 may be a generic computer system, laptop, tablets, smart phones, desktop or the like.

The sensor 132 may be any device configured to capture or scan its surroundings. Some of the non-limiting examples of the sensor 132 includes camera, depth sensor, optical sensor, image sensor, image capturing device or the like, In some embodiments, the computing environment 100 may also be a sub-system of one of the above-listed systems. In some other embodiments, the computing environment 100 may be an "off the shelf" generic computer system. In some embodiments, the computing environment 100 may also be distributed amongst multiple systems. In some embodiments, the computing environment 100 is virtualized in the "cloud" so that processing power and/or memory capacity may be scaled up or down depending on actual needs for executing implementations of the present technology. The computing environment 100 may also be specifically dedicated to the implementation of the present technology. In some embodiments, the computing environment 100 may be configured to operate in offline mode and all the operations may be performed locally on the computing environment 100 without any need of communication with an external server/cloud. In offline mode, the computing environment 100 may also be configured to share its data with the server/cloud whenever a connection to the network is ready. In some embodiments, the computing environment 100 may be configured to operate to perform at least some of its operations in online mode that is, the computing environment 100 may be connected to a network to increase processing power and/or memory capacity. As a person in the art of the present technology may appreciate, multiple variations as to how the computing environment 100 is implemented may be envisioned without departing from the scope of the present technology.

Communication between the various components of the computing environment 100 may be enabled by one or more internal and/or external buses 160 (e.g. a PCI bus, universal serial bus, IEEE 1394 "Firewire" bus, SCSI bus, Serial-ATA bus, ARINC bus, etc.), to which the various hardware components are electronically coupled.

The input/output interface 150 may allow enabling networking capabilities such as wire or wireless access. As an example, the input/output interface 150 may comprise a networking interface such as, but not limited to, a network port, a network socket, a network interface controller and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi or Token Ring. The specific physical layer and the data link layer may provide a base for a full network, allowing communication among small groups of computers on the same local area network (LAN) and large-scale network communications through routable protocols, such as Internet Protocol (IP).

According to implementations of the present technology, the solid-state drive 120 stores program instructions suitable for being loaded into the random access memory 130 and executed by the processor 110 for augmenting the 3D objects training dataset. For example, the program instructions may be part of a library, an application, API, framework, software as a service (SaaS) or the like. The solid-state drive 120 may also store various databases including 3D objects training dataset, metadata, user information such as login, activity history or the like.

Figure 2:
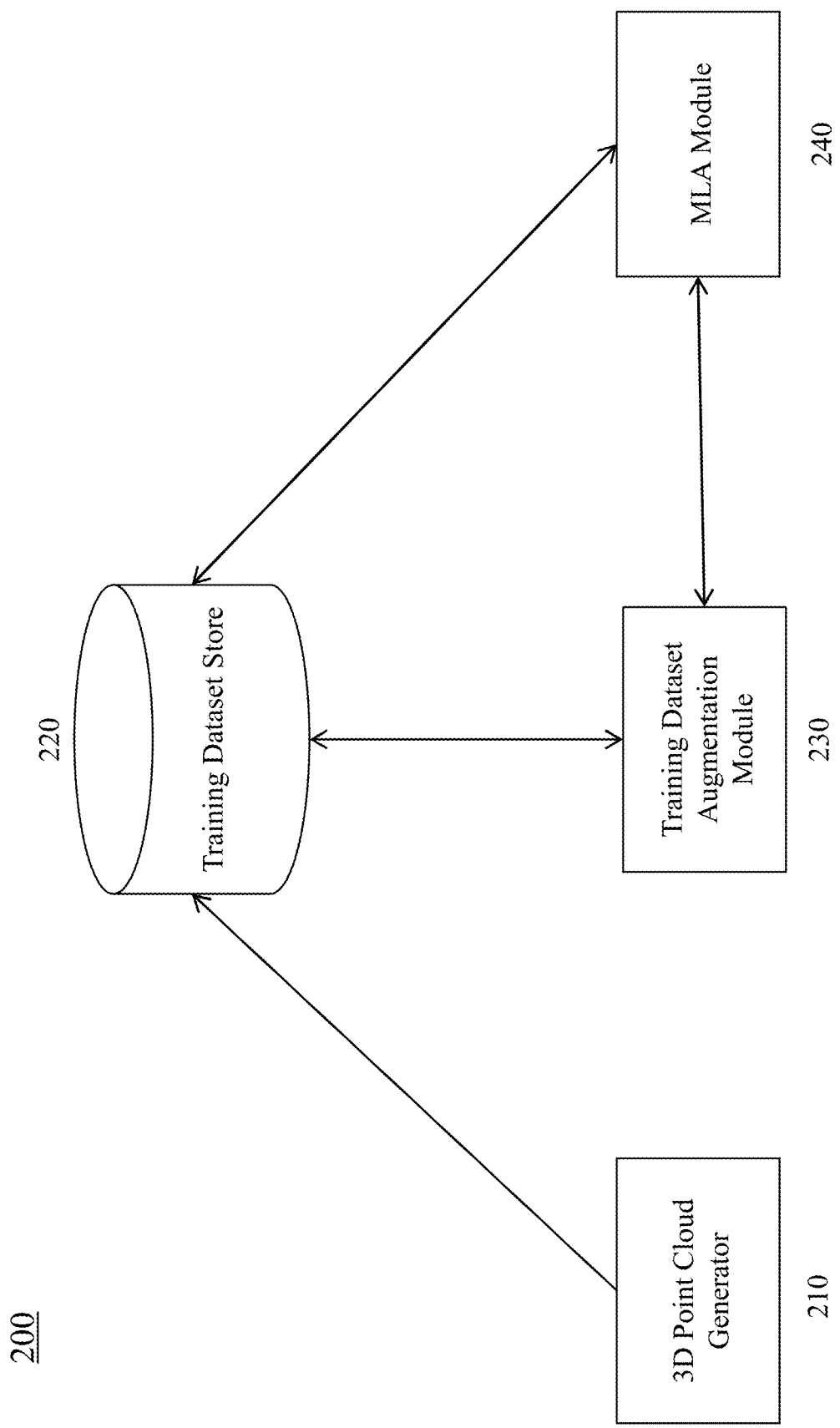
FIG. 2 is an illustration of a representative architecture for executing the method of augmenting the 3D objects training dataset, in accordance with various embodiments of the present technology.

FIG. 2 is an illustration of a representative computing architecture 200 for executing the method of augmenting the 3D objects training dataset, in accordance with various embodiments of present technology. As shown, the computing architecture 200 includes a 3D point cloud generator 210, a training dataset store 220, a training dataset augmentation module 230, and a machine learning algorithm (MLA) module 240. It is to be noted that other components may be present but not illustrated for the purposes of tractability and simplicity. Further, it will be appreciated that the various components associated with the computing architecture 200 may be executed on the computing environment 100 such as the 3D point cloud generator 210, the training dataset augmentation module 230, and the MLA module 240 may be executed on the processor 110 by program instructions having been loaded, for example, into random access memories. Also, the training dataset store 220 may be stored and accessed from the solid-state drive 120.

The 3D point cloud generator 210 may be configured to generate a 3D point cloud representation from a 3D representation of a 3D object. In certain embodiments, the 3D representation of the 3D object may be generated by the computing environment 100. In certain embodiments, the 3D representation of the 3D object may be generated by any software known by the skilled person, such as a CAD software or a 3D modeling software. In certain embodiments, the 3D representation of the 3D object may be generated by a 3D scanner or using photogrammetry techniques. It will be appreciated that how the 3D point cloud representation is generated by the 3D point cloud generator 210 should not limit the scope of the present technology. Once the 3D point cloud representation is generated, the 3D point cloud generator 210 may store the 3D point cloud representation in the training dataset store 220 as a part of a 3D objects training dataset.

In certain non-limiting embodiments, the 3D point cloud generator 210 may create the 3D objects training dataset by storing one 3D point cloud representation associated with the respective 3D object. To this end, FIG. 5 illustrates a representative side view 302 and top view 304 associated with a 3D point cloud representation 300 of the 3D object, in accordance with various embodiments of the present technology. In some other embodiments, a 3D point cloud representation 300 of a 3D object may be made of several rigid parts attached to one another and articulated to allow different representation of the 3D object. Examples of non-rigid objects include, without limitation, human bodies or human bodies parts (arms, fingers, spine . . . ), vehicles with doors, robotic arms, articulated industrial parts, and the like. Examples of a non-rigid object are shown in FIG. 16-19.

Figure 3:
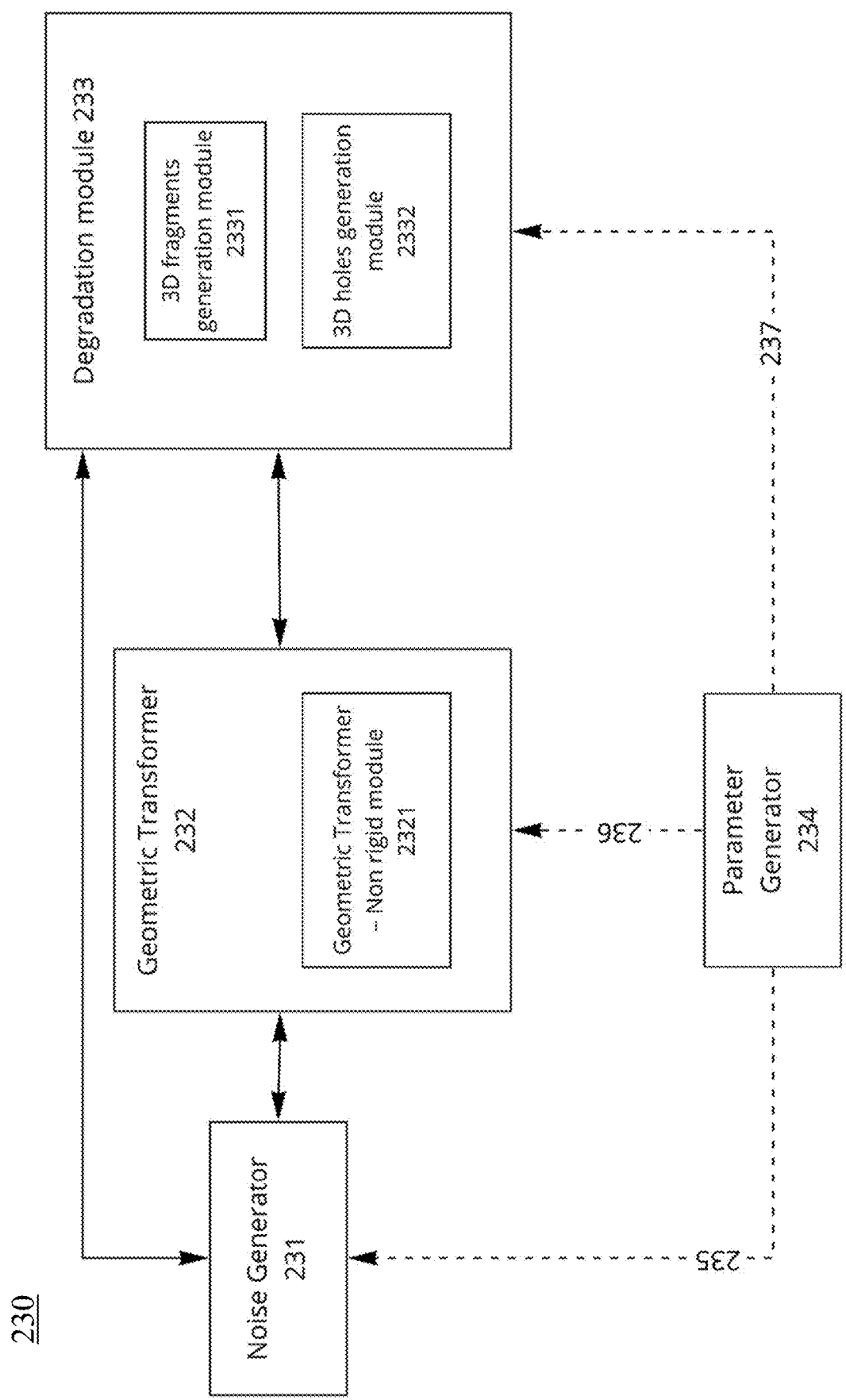
FIG. 3 is an illustration of a training dataset augmentation module, in accordance with various embodiments of the present technology.

Returning to FIG. 2, the training dataset augmentation module 230 may be configured to access and modify the 3D point cloud representations in the 3D objects training dataset to generate the augmented 3D objects training dataset by applying an augmentation routine. It is to be noted that augmentation routine may be implemented as a perturbation routine, an augmentation routine or a combination thereof. To this end, as illustrated in FIG. 3, the training dataset augmentation module 230 may include a noise generator 231, a geometric transformer 232 accessing a non-rigid specific geometric transformer 2321, a degradation module 233 accessing a 3D fragments generation module 2331 and a 3D holes generation module 2332, and a parameter generator 234. It is to be noted that other components may be present but not illustrated for the purposes of tractability and simplicity.

One aspect of the present technology is to generate the augmented 3D objects training dataset. In certain embodiments, such augmented 3D objects training dataset may be used to train a machine learning algorithm (MLA) to identify at least one non-synthetic 3D object. In general, a non-synthetic 3D object may be any object in the real-world and is not synthesized using any computer rendering techniques. Certain non-limiting examples of a non-synthetic 3D object may be any real-world objects such as a computer screen, a table, a chair, a coffee mug or a mechanical component on an assembly line, any type of inanimate object or even any type of animal, a plant. It will be appreciated that the scope of present technology should not be limited by the type of non-synthetic 3D object.

As such, the at least one non-synthetic 3D object may be subject to various sorts of noises, to this end, the noise generator 231 may be configured to generate a noise that may mimic at least a portion of noise associated with the non-synthetic 3D object. The noise generator 231 may add the generated noise to the accessed 3D point cloud representation, such as 3D point cloud representation 300 to generate an augmented 3D point cloud representation 400, as represented in FIG. 6. In certain embodiments, the noise generator 231 may generate the noise based on a noise random parameter 235. In certain embodiments, the noise added by the noise generator 231 is constrained such that perturbation associated with the augmented 3D point cloud representation 500 is within a finite envelope. In certain embodiments, the noise generated by the noise generator 231 may include, but not limited to, White Gaussian noise, Voroni noise and/or Fractal noise. Additionally, common 2D-related noise (e.g., Salt and Pepper, film grain, fixed-pattern, Perlin, simplex and/or Poisson noise) are applicable on the surface of a 3D model and generated by the noise generator 231.

Figure 7:
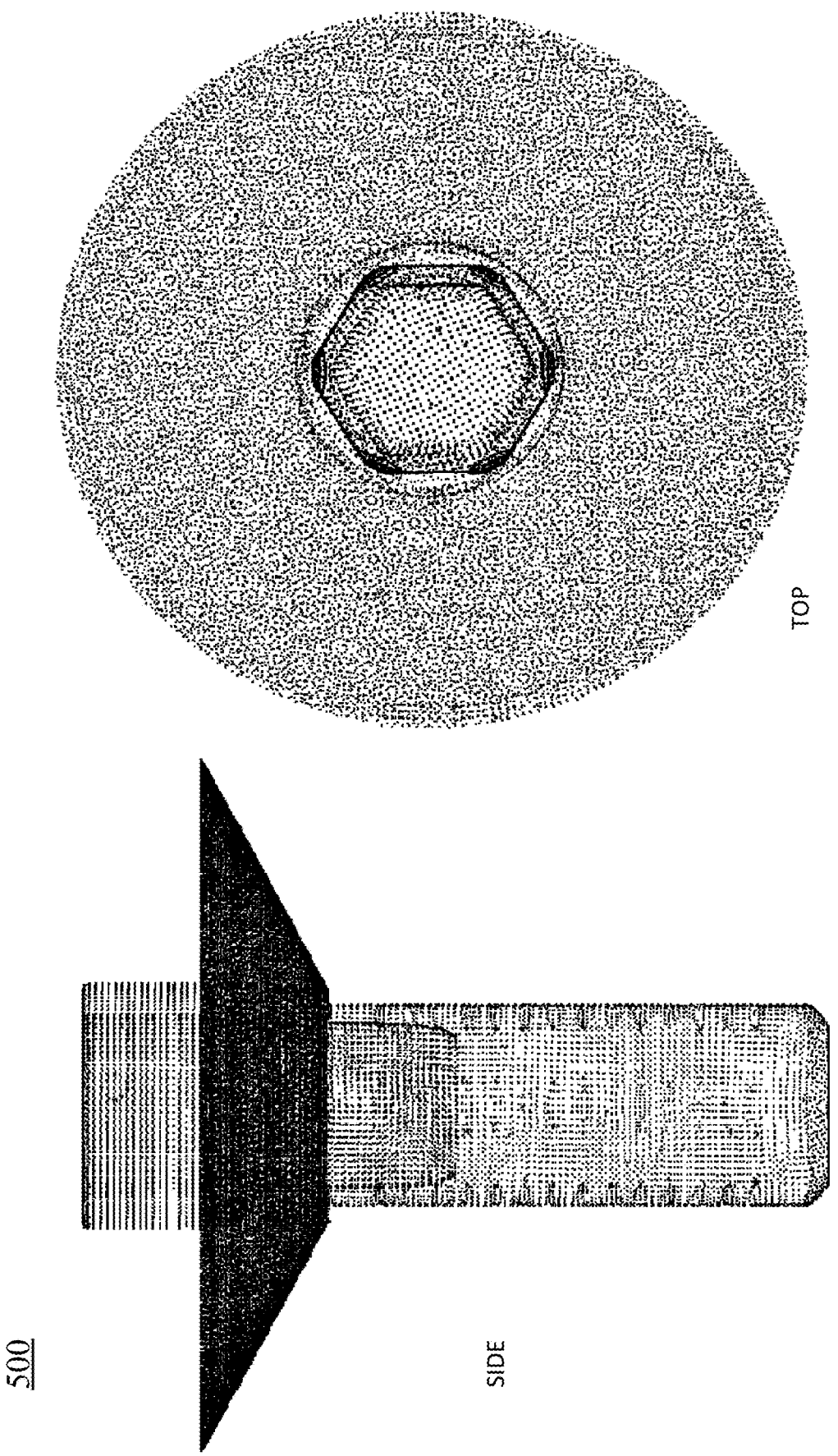
Figure 9:
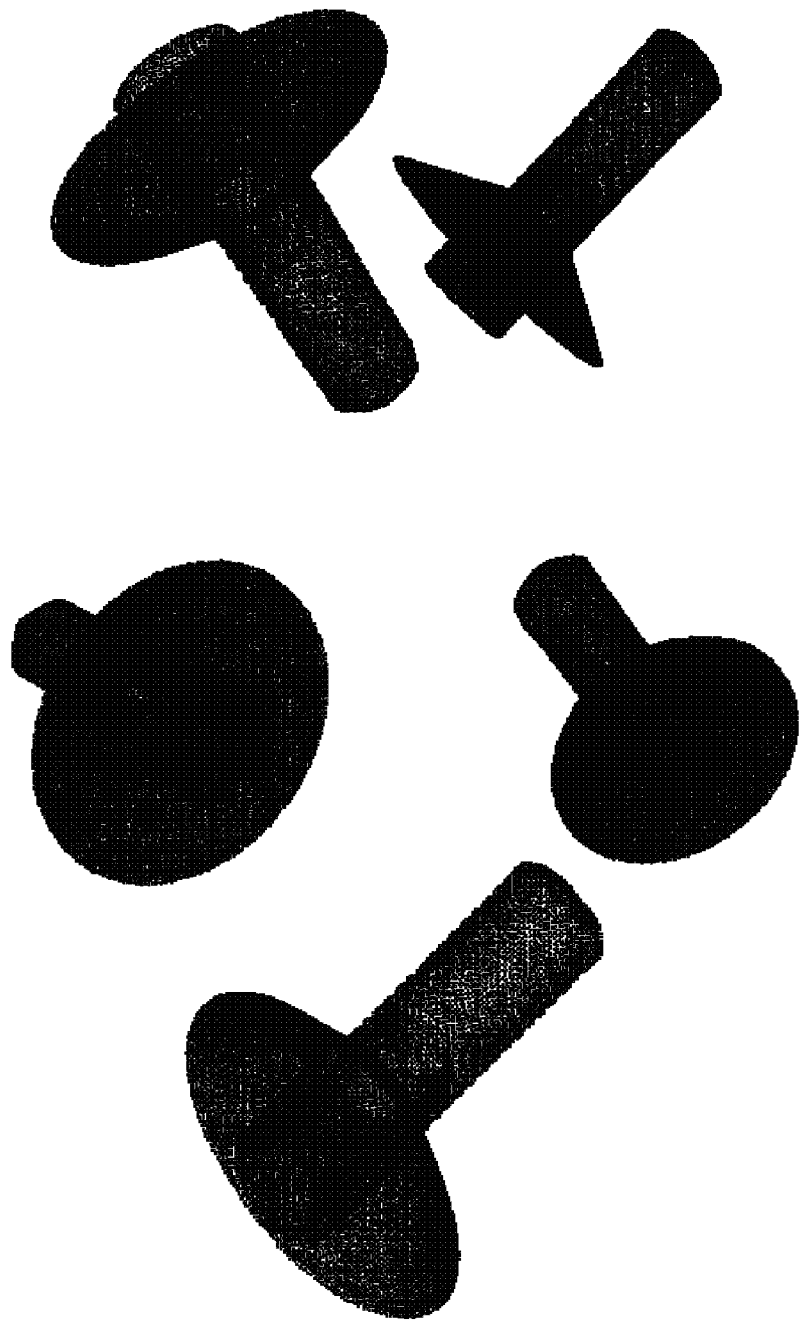
Figure 16:
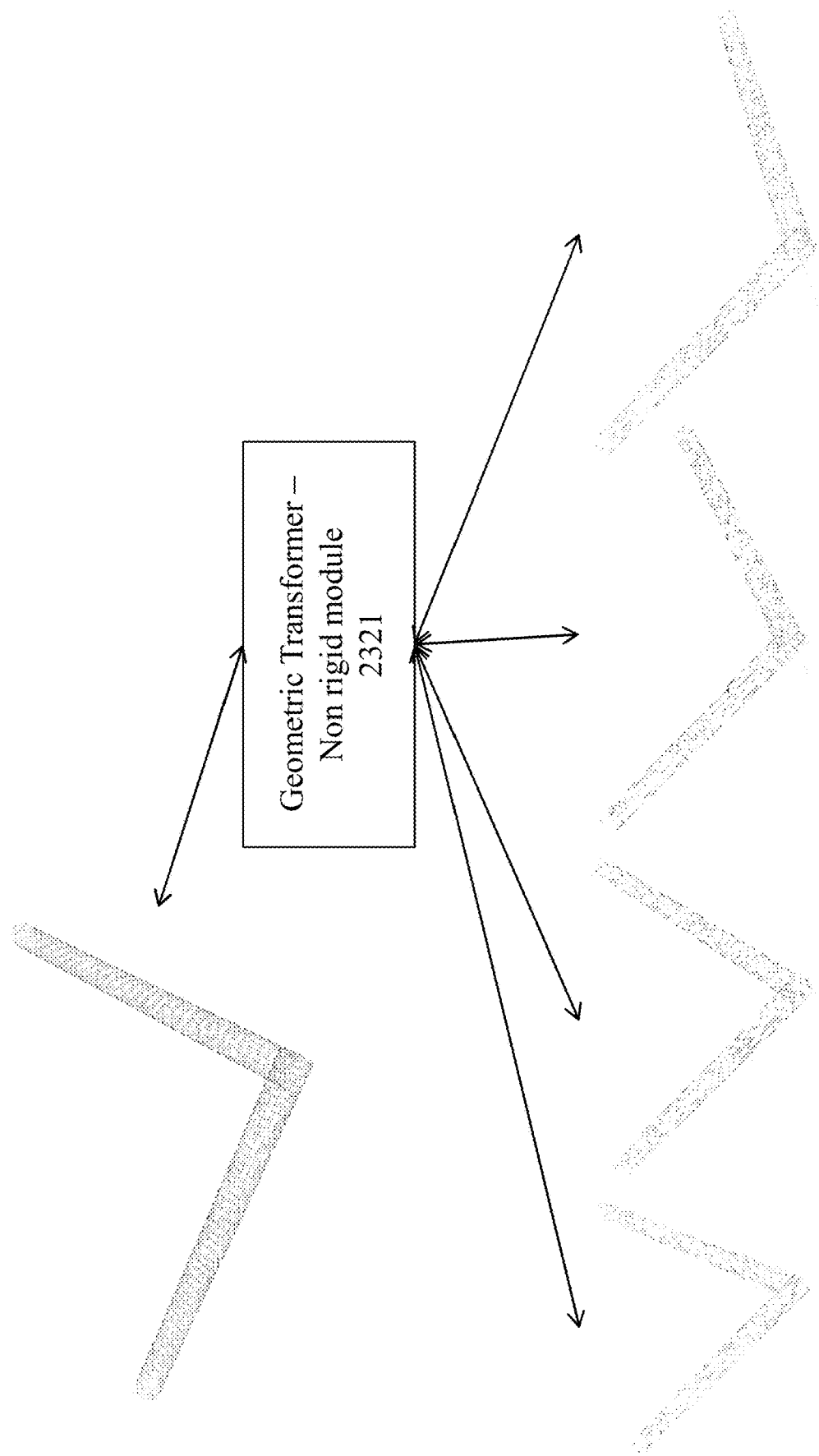
FIGS. 16-19 illustrate representative 3D point clouds of a 3D object that may be made of several rigid parts attached to one another and articulated to allow different representations of the 3D object, in accordance with various embodiments of the present technology.
Figure 17:
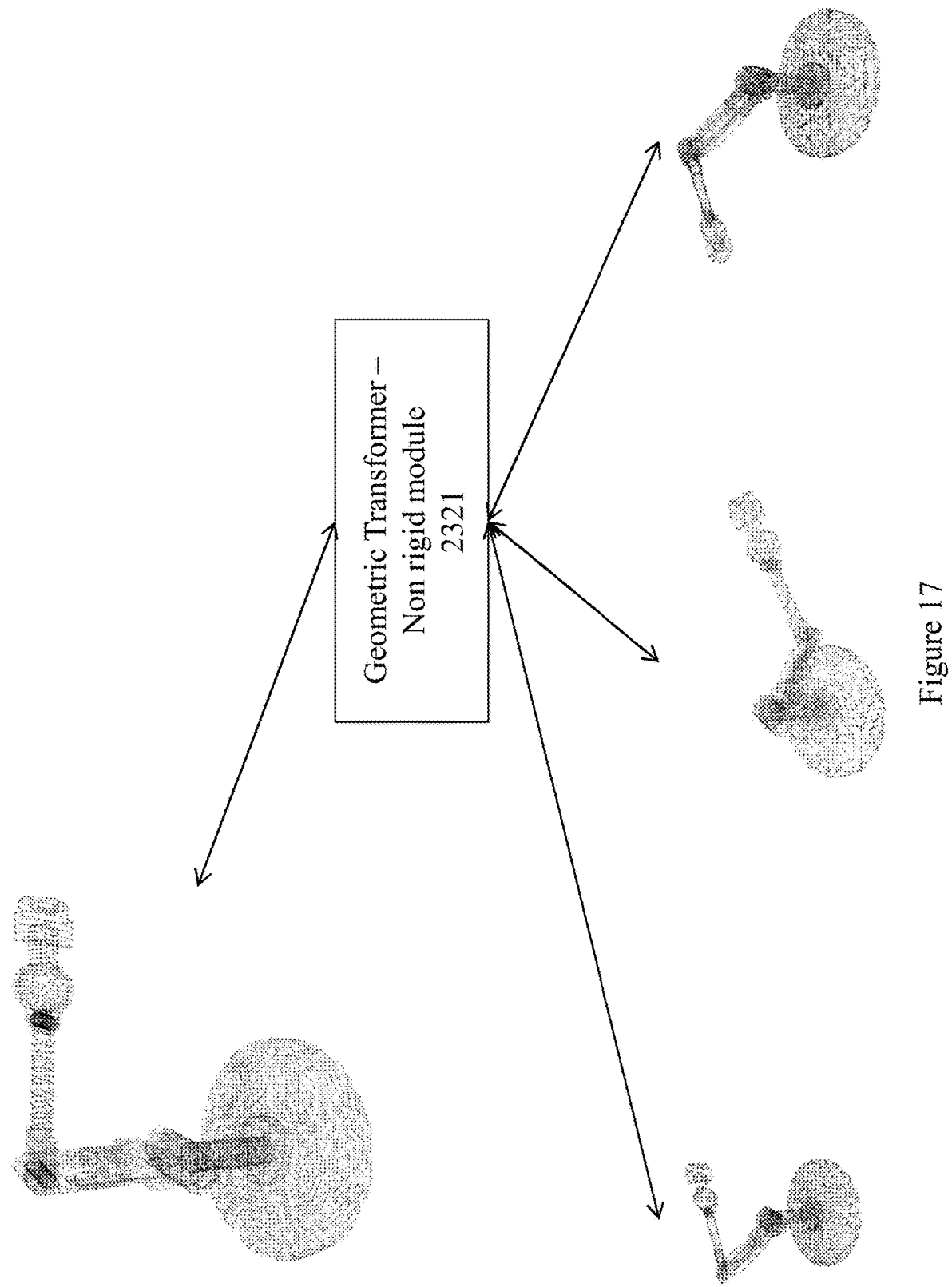
Figure 18:
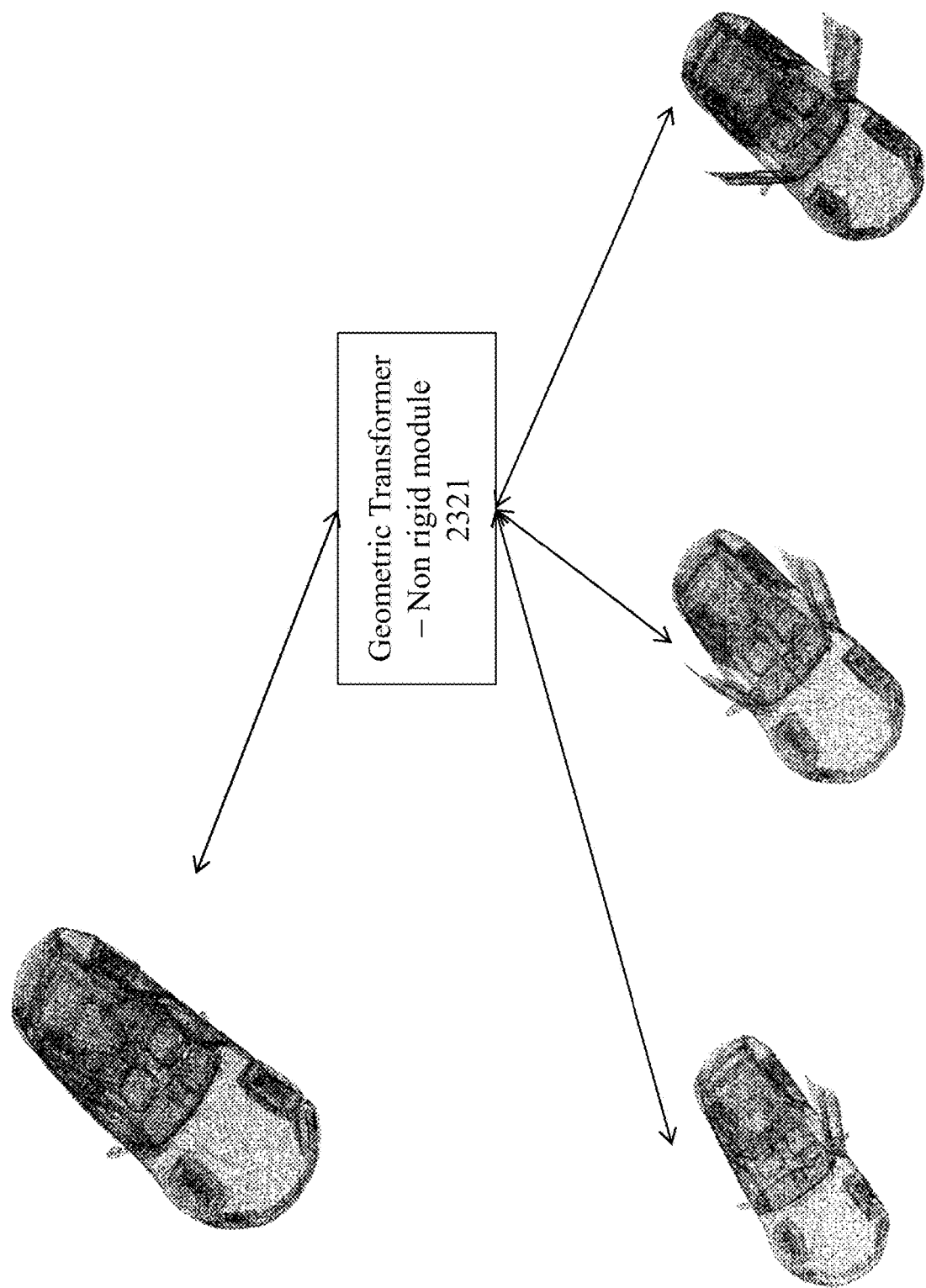
Figure 19:
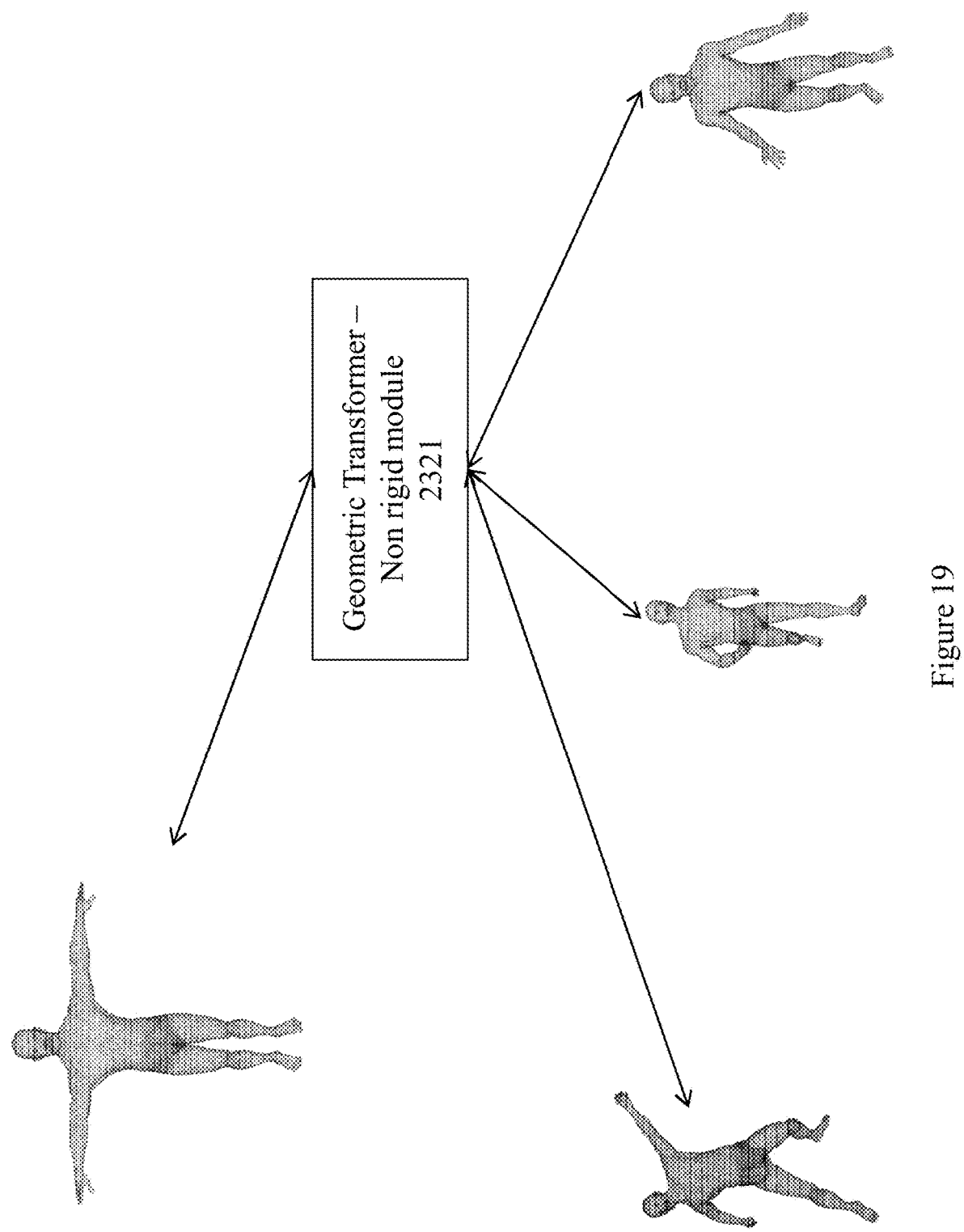

The geometric transformer 232 may be configured to apply one or more geometric transformations on the 3D point representation 300. Examples of one or more geometric transformations include but are not limited to changing the size of the 3D point cloud representation 300, applying a rotation to the 3D point cloud representation 300, applying shifting and/or translating to the 3D point cloud representation 300, applying a rotation to articulations of the 3D point cloud representation 300, applying scale-agnostic transformation matrix operations to the 3D point cloud representation 300, applying a reflection to the 3D point cloud representation 300, applying a tessellation to the 3D point cloud representation 300, or some combination thereof. For example, FIGS. 7-9 illustrate geometrically transformed 3D point cloud representations 500, 550 and 600 respectively. In particular, the geometrical transformation associated with the geometrically transformed 3D point cloud representation 500 is a change in the position and the geometrical transformation associated with the geometrically transformed 3D point representation 550 is applying the rotation. The geometrical transformation associated with the geometrically transformed 3D point cloud representation 600 represents various examples of the applying shifting and/or translations. It is to be noted that any one or more these transformations may be applied and in case of more than on transformation, the order in which these transformations may be applied should not limit the scope of the present disclosure.

In certain embodiments, the geometric transformer 232 may apply the one or more geometric transformations based on a geometric transformation random parameter 236 as generated by the parameter generator 234. As such, the geometric transformation random parameter 236 may depend upon type of geometric transformation being applied. For example, the geometric transformation random parameter 236 associated with applying the rotation may be random angle in between 0° to 360°. As another example, the geometric transformation random parameter 236 associated with the shifting parameters may be conditioned according to a pre-defined world/scene maximum size and avoiding the intersections between each 3D object's own bounding box. For different types of geometric transformations, the geometric transformation random parameter 236 may have different values.

In certain embodiments, the 3D point cloud generator 210 may provide non-rigid objects under the form of a 3D point cloud representation 300. A non-rigid object is defined by the skilled person as an assembly of rigid parts connected together by articulations offering up to 3 degrees of freedom in rotation. In some embodiments, the non-rigid object is equipped with a rigging system that allows the animation of its independent rigid parts by rotating an axis around an articulation (pivot point), this pivot point being the connection between 2 separate rigid parts of the non-rigid object.

In the case of 3D point clouds generated by the 3D point cloud generator 210, the geometric transformer 232 may use a specific geometric transformer of non-rigid object module 2321. As described in FIG. 3, the geometric transformer of non-rigid object module 2321 applies random rotations on the articulations of the non-rigid object in order to generate more 3D models to be available in training dataset store 220. Those random rotations may be applied by the module 2321 according to random parameters 236 as generated by the parameter generator 234. For example, the geometric transformation random parameter 236 associated with applying 1 to 3 rotations may be random angle in between 0° to 360°. As another example, the geometric transformation random parameter 236 may be conditioned according to a pre-defined set of constraints included in 3D models accessed from 3D point cloud generator, such as for example from 0° to 90° for some human bodies' articulations. For different types of geometric transformations, the geometric transformation random parameter 236 may have different values.

In some embodiments, the transformation generated by module 2321 may be applied either on models directly accessed from the 3D point cloud generator 210 or on models already transformed by augmentation module 230 and previously stored in the training dataset store 220. In some other embodiments, module 2321 may be randomly accessed independently of other augmentation modules if the 3D model to transform is a non-rigid object. In some other embodiments and as long as the 3D model to augment is a non-rigid object, module 2321 may be randomly accessed in any random combination with any randomly chosen transformer 231, 232, 233 and/or 2331 and 2332.

As previously discussed, the augmented 3D objects training dataset may use to train MLA to identify at least one non-synthetic 3D object, there is a possibility that the non-synthetic 3D object to be identified is occluded or degraded due to any reason. For example, in certain real-world situations a non-synthetic 3D object may be scanned or captured by any non-limiting means such as using the sensor 132 to generate 3D point cloud representation of the non-synthetic 3D object. There are chances that the sensor 132 will only capture a part of the non-synthetic 3D object and not the non-synthetic 3D object in its entirety. Hence, a dataset training the MLA should have relevant entries such that the trained MLA is capable of identifying the non-synthetic 3D object even under occluded or degraded conditions.

To this end, the degradation module 233 may be configured to apply degradation on the 3D point cloud representation 300. In doing so, the degradation module 233 may remove a group of 3D points from the 3D point cloud representation 300 so as to better reflect how a corresponding object may be perceived in a real-world setting (e.g., when a screw is located on a flat surface thereby occluding a bottom section or the like). In certain embodiments, the degradation module 233 may apply the degradation based on a degradation random parameter 237 as generated by the parameter generator 234.

Figure 4:
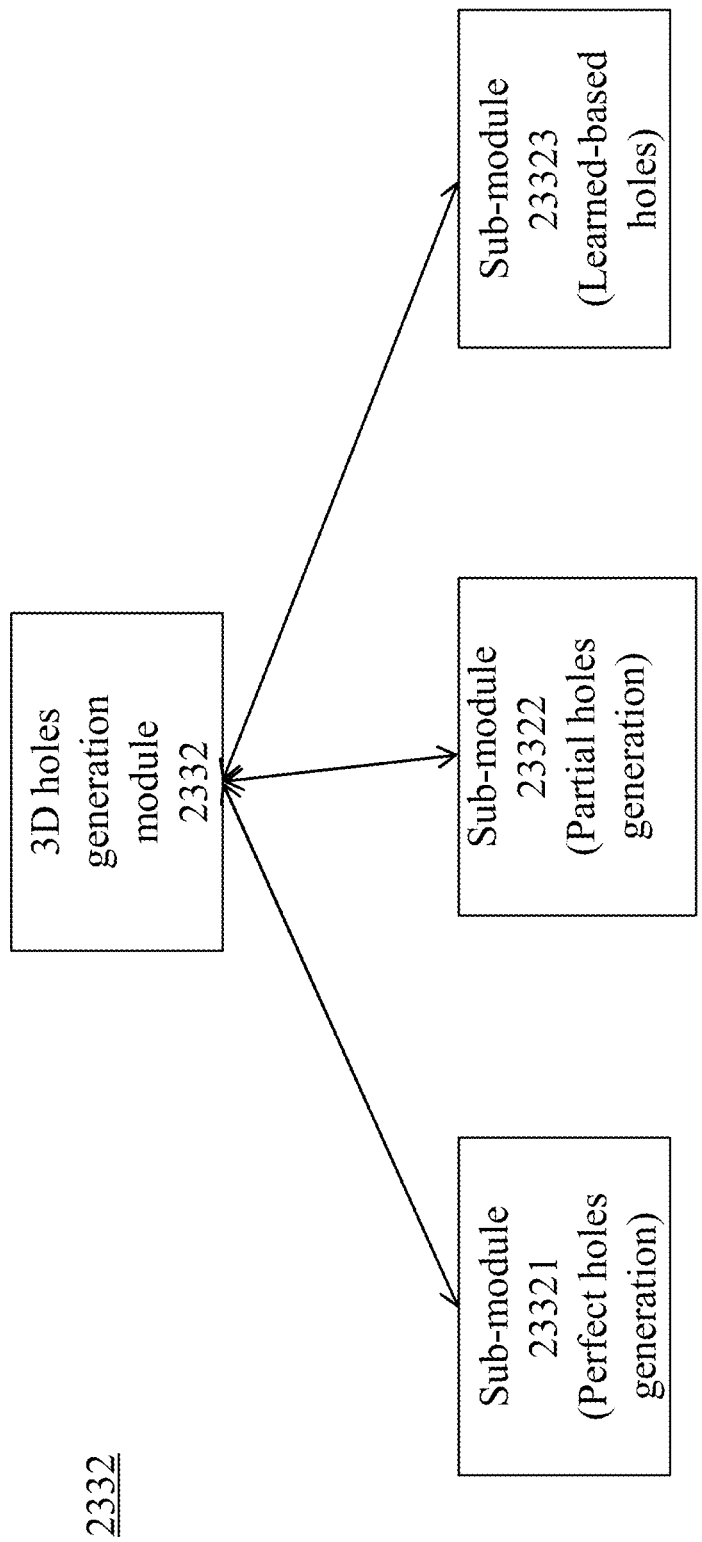
FIG. 4 is an illustration of the 3D holes generation module, in accordance with various embodiments of the present technology.

In certain embodiments, instead of removing a group of 3D points, the degradation module 233 may be configured to create random holes in the 3D point cloud representation 300 using the 3D holes generation module 2332, as shown on FIG. 4. In so doing, the 3D holes generation module 2332 may select N random 3D points. In some embodiments, the 3D holes generation module 2332 may use sub-module 23321 that determines and removes up to K-nearest neighboring 3D points around the $n^{th}$ random 3D point. The sub-module 23321 performs this removal of up to K-nearest neighboring 3D points for all N random 3D points. The values of N and K may vary and may be determined, but not limited to, in association with the size and resolution of the 3D point cloud representation 300.

In some other embodiments, the 3D holes generation module 2332 may use sub-module 23322 that determines the K-nearest neighboring 3D points around the $n^{th}$ random 3D point, and removes M random 3D points within the range of the determined K-nearest neighboring 3D points, where M value is smaller than the K value (M<K). The sub-module 23322 performs this partial removal of up to M 3D points for all N random 3D points.

In some other embodiments, the 3D holes generation module 2332 may use sub-module 23323 that may be configured to generate holes that may mimic at least a portion of holes associated with the non-synthetic 3D object. The sub-module 23323 may create the holes to the accessed 3D point cloud representation, such as 3D point cloud representation 300 to generate an augmented 3D point cloud representation 400. In these embodiments, the sub-module 23323 may create the holes based on patterns learned from one or more of the non-synthetic 3D objects using an MLA module 240. This MLA module 240 may, in a non-limiting example, comprise a generative adversarial network (GAN) based module.

At each $n^{th}$ random 3D point on the 3D point cloud representation 300, the 3D holes generation module 2332 may apply any combination of 3D holes generation sub-modules contained in module 2332.

In some embodiments, some random "2D surface patterns" such as but not limited to circles, polygons, or any 2D projections of a 3D shape in a 2D or 3D surface may be randomly applied to the 3D point cloud representations to randomly remove some 3D points (vertices) of the 3D point cloud representations. In some embodiments, some random "3D objects" such as (but not only) any object already generated by the 3D point cloud generator 210 and/or have already stored in the training dataset store 220, may be randomly intersected with the 3D point cloud to randomly remove some 3D points (vertices) of the 3D point cloud.

In some other embodiments, the MLA module may be trained and used with some partial point clouds called 3D fragments. A 3D fragment is extracted from a 3D point cloud by removing all hidden points of the point cloud; see for example FIG. 20. The remaining points are the ones seen from a single point of view. Those fragments are for example obtained by using RGB-D to perform 3D reconstructions with only one picture (i.e. a single point of view) embedding a depth channel. Those pictures are obtained by using specific sensors (depth sensors) that are increasingly available on smart devices (e.g. LIDAR sensors, time of flight sensors, infrared sensors . . . ), such as for example and without limitation Apple iPhone 12™, Samsung Galaxy S20™, Huawei P30 Pro™, and Nokia 7.2™.

In some embodiments, the transformation generated by module 2331 may be applied either on models directly accessed from the 3D point cloud generator 210 or on already transformed models by augmentation module 230 and previously stored in the training dataset store 220. In some other embodiments, module 2331 may be randomly accessed independently of other augmentation modules. In some other, module 2331 may be randomly accessed in any random combination with any randomly chosen transformer 231, 232, 2321 and/or 233.

It is to be noted that the functionality of the training dataset augmentation module 230 is not limited to an order by which various elements of the augmentation routine has been applied to the 3D point cloud representation 300. In one instance, the noise may be added after the 3D point cloud representation 300 has been degraded while in other examples the size of the 3D point cloud may be changed before the 3D point cloud representation 300 has been degraded. To this end, FIGS. 10-15 illustrate examples of the 3D point cloud representations 700, 750, 800, and 850. In 3D point cloud representations 700, 750, and 800, noise is first added to the 3D point cloud representation 300 and then the 3D point cloud representation 300 is randomly degraded (i.e. by removing random points) differently to generate the 3D point cloud representations 700, 750, and 800 respectively. In 3D point cloud representation 850, some 2D surface patterns have been randomly removed from the 3D point cloud representation 300.

As noted above, the parameter generator 234 is configured to generate various random parameters such as 235, 236 and 237 used to determine various operating ranges corresponding to various elements of the augmentation routine, such as adding noise, applying geometric transformation, and applying degradation. However, it will be discussed below in further details that in certain embodiments, the parameter generator 234 may also be configured to generate various and dynamic specific parameters used to determine various operating ranges corresponding to various elements of augmentation routine. As such, this functionality of the parameter generator 234 may depend on input from the MLA module 240.

With this said, the training dataset augmentation module 230 may be configured to apply the augmentation routine on the 3D point cloud representation 300, the augmentation routine may comprise randomly selecting and applying an execution order of adding the noise to the 3D point cloud representation 300 and/or applying the geometric transformation to the 3D point cloud representation 300 and/or applying the degradation on the 3D point cloud representation 300 in any random order and not limited to only one augmentation routines as applied by the noise generator 231, geometric transformer 232 with its non-rigid geometric transformer module 2321 and/or degradation module 233 with its 3D fragment generation module 2331. Once augmented 3D point cloud representations such as 700, 750, 800, and 850 or the like has been generated by the training dataset augmentation module 230, augmented 3D point cloud representations may be added to the 3D objects training dataset to augment the 3D objects training dataset.

In certain non-limiting embodiments the training dataset augmentation module 230 may also be configured to access a first augmented 3D point cloud representation associated with a first 3D object and a second 3D point cloud representation associated with a second 3D object. The training dataset augmentation module 230 may apply the augmentation routine (as discussed above) on the second 3D point cloud representation to generate a second augmented 3D point cloud representation. The training dataset augmentation module 230 may synthesize a scene comprising the first augmented 3D point cloud representation and the second augmented 3D point cloud representation. The training dataset augmentation module 230 may add the synthesized to the 3D objects training dataset to augment the 3D objects training dataset.

Figure 21:
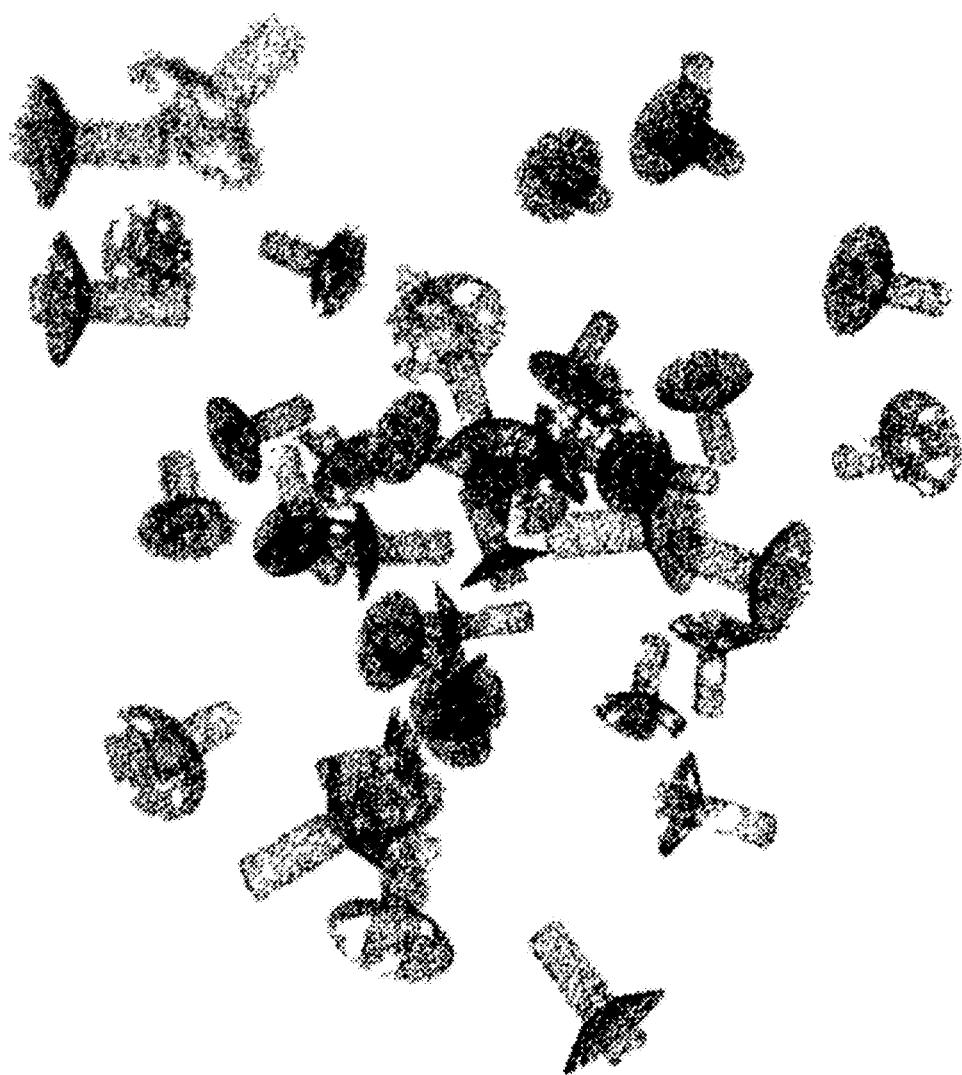
FIG. 21 illustrates a scene synthesized by a training dataset augmentation module, in accordance with various embodiments of present technology.

FIG. 21 illustrates a scene 900 synthesized by the training dataset augmentation module 230, in accordance with various embodiments of present technology. As shown, the scene comprises a plurality of augmented 3D point cloud representation. It is to be noted that although the scene 900 illustrates 3D point cloud representations of the same object, however, the training dataset augmentation module 230 may be configured to add 3D point cloud representations of different objects without limiting the scope of present technology.

Thus by virtue of the present technology, the computing architecture 200 may augment the 3D objects training dataset in a cost-effective manner. In certain embodiments, the computing architecture 200 may initially prepare the 3D objects training dataset with fewer entries. Such as one 3D point cloud representation per 3D object. The computing architecture 200 then may augment the 3D objects training dataset with fewer entries (as small as one) to increase the number of 3D point cloud representations per 3D object. In so doing, the computing architecture 200 may apply the augmentation routine (as discussed above) on the initial 3D point cloud representation and may generate various 3D point cloud representations per 3D object.

In general, the augmented 3D objects training dataset may be used to train MLA to identity a non-synthetic 3D object. Such non-synthetic 3D objects may be subject to various noises, occultation and degradations. To mimic the environment around a non-synthetic 3D object, the augmentation routine applied by the computing architecture 200 includes adding noise, applying geometric transformations, and applying degradations on the 3D point cloud representations. Having these flexibilities with various random permutations and/or combinations of elements of the augmentation routine for modifying one 3D point cloud representation per 3D object may result in a large number of 3D point cloud representation entries per 3D object. Thereby, if a neural network and/or MLA is trained using the augmented 3D objects training dataset will have a better reliability and efficiency in terms of identifying the non-synthetic 3D object than the neural network and/or MLA trained without the augmented 3D objects training dataset.

It is to be noted that the terms "3D objects training dataset" and "augmented 3D objects training dataset" may be used interchangeably herein. The first term may represent initial training set with fewer entries and second term may represent initial training set along with added entries. Also, it will be appreciated in some embodiments, the computing architecture 200 may create the 3D objects training dataset based on images captured by the sensor 132. Whereas, in other embodiments, the computing architecture 200 may be provided with an existing 3D objects training dataset. Thus, how the initial 3D objects training dataset is accessed by the computing architecture 200 should not limit the scope of present technology.

Figure 22:
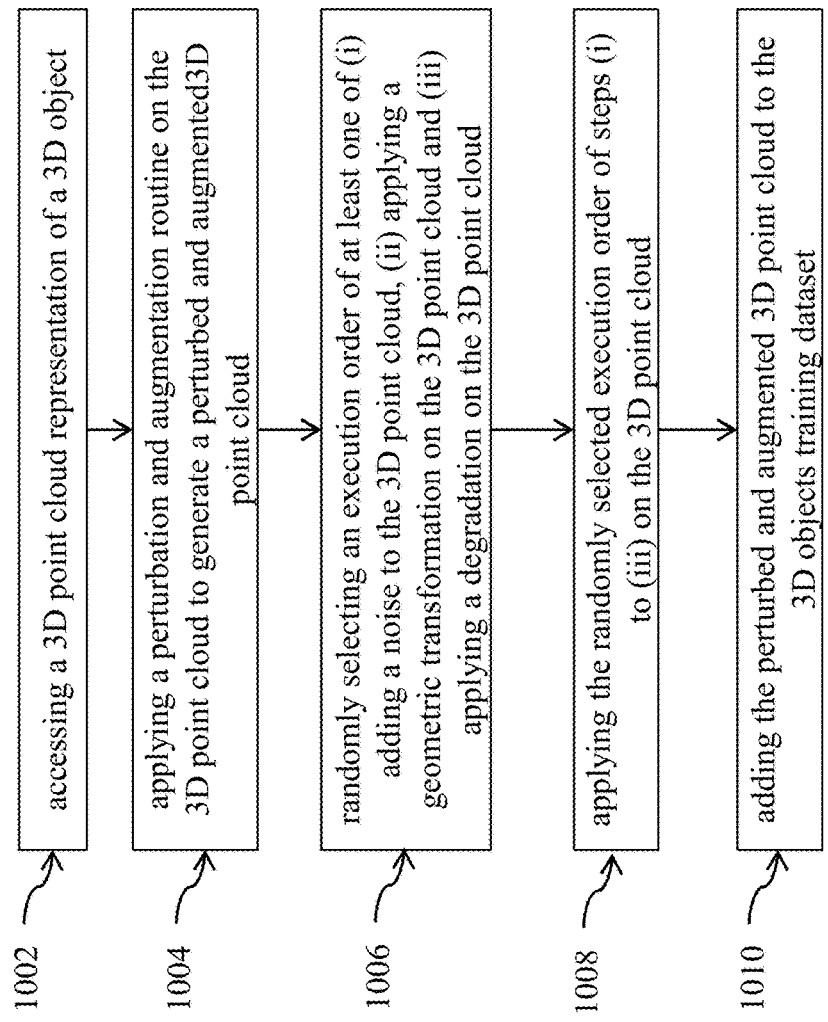
FIG. 22 is an illustration of a method carried out in accordance with non-limiting embodiments of the present technology.

Referring now to FIG. 22 illustrating a computer-implemented method used in connection with augmenting the 3D objects training dataset shall now be discussed. More specifically, FIG. 22 shows flowcharts illustrating a computer-implemented method 1000 implementing embodiments of the present technology. The computer-implemented method of FIG. 22 may comprise a computer-implemented method executable by the computing architecture 200. As such, the computing architecture 200 may be executed by a processor of a computing environment, such as the computing environment 100 of FIG. 1, the method comprising a series of operations to be carried out by the computing environment 100.

The computer-implemented method of FIG. 22 may be carried out, for example, by a processor executing program instructions having been loaded, for example, into random access memories.

The method 1000 begins at operation 1002 where the training dataset augmentation module 230 accesses a 3D point cloud representation of a 3D object. As previously noted, the 3D point cloud representation of the 3D object, previously acquired through various methodologies which will become apparent to the person skilled in the art of the present technology, may be accessed from the 3D objects training dataset stored in the training dataset store 220.

The method 1000 proceeds to operation 1004, where the training dataset augmentation module 230 apply the augmentation routine on the 3D point cloud representation to generate the augmented 3D point cloud representation. As noted above, in order to augment the 3D objects training dataset the training dataset augmentation module 230 apply the augmentation routine on the 3D point cloud representation 300. As the augmentation routine includes various elements such as adding a noise, applying a geometric transformation, and applying a degradation, at operation 1006, the training dataset augmentation module 230 may randomly select an execution order of various elements of the augmentation routine. In particular, the training dataset augmentation module 230 randomly selects the execution order of at least one of (i) adding the noise to the 3D point cloud representation (ii) applying the geometric transformation on the 3D point cloud representation and (iii) applying a degradation on the 3D point cloud representation.

Once the execution order is selected, the method 1000 advances to stem 1008. At operation 1008, the training dataset augmentation module 230 applies the randomly selected execution order of operations (i) to (iii) on the 3D point cloud representation. Finally, at operation 1010, the training dataset augmentation module 230 adds the augmented 3D point cloud representation to the 3D objects training dataset.

Another aspect of the present technology is to train the MLA for identifying, recognizing, segmenting, and/or classifying 3D objects based at least in part on the 3D objects training dataset. It is to be noted that in the present disclosure, the 3D objects training dataset is used to train the neural network and/or MLA for segmentation, recognition and classification. However, it will be appreciated that without limiting the scope of present disclosure, the 3D objects training dataset may be used to train any suitable neural network and/or MLA. Further, in the present disclosure, the neural networks and/or MLAs have been trained to identify at least one non-synthetic 3D object. It is to be noted that the concept discussed in the present disclosure should be equally applicable to identify a 3D point cloud representation of a synthetic object generated by any software known by the skilled person, such as CAD software, 3D modeling software or the like. Also, in certain embodiments, the number of points in 3D point cloud representations of synthetic or non-synthetic objects to be identified or recognized may be equal to the number of points in 3D point cloud representations stored in the augmented 3D objects training dataset.

Figure 23:
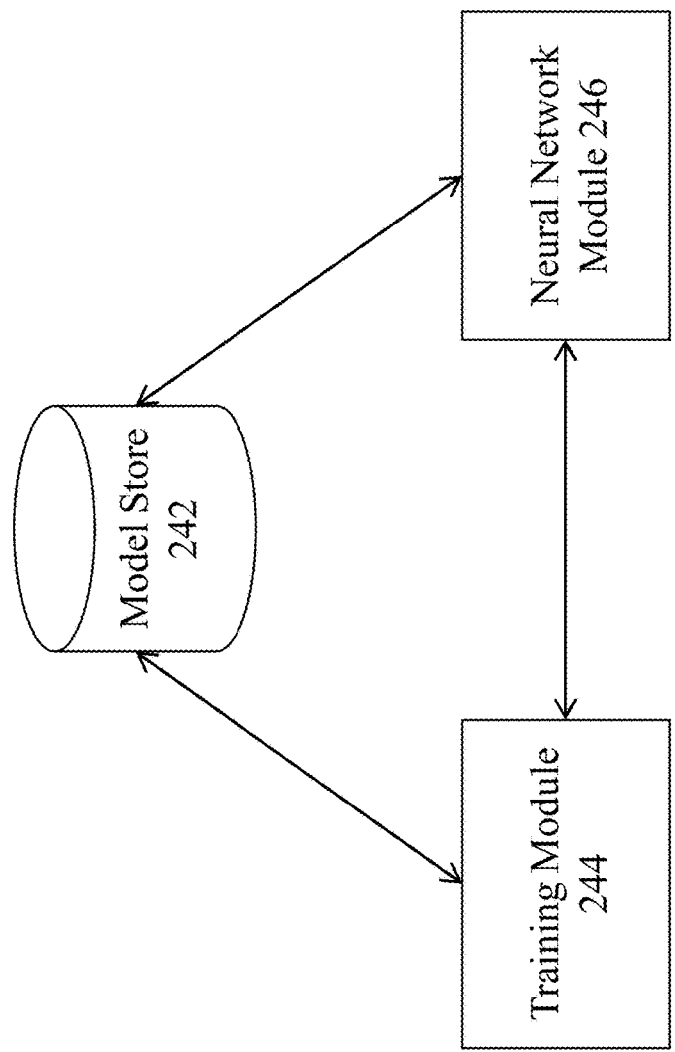
FIG. 23 is an illustration of a machine learning module, in accordance with various embodiments of the present technology.

With this said, as illustrated in FIG. 23, the MLA module 240 may include a model store 242, a training module 244, and a neural network module 246. It is to be noted that other components may be present but not illustrated for the purposes of tractability and simplicity.

The model store 242 may store trained and/or untrained neural network models or MLAs. The model store 242 may provide the untrained neural network models to the training module 244, and provides the trained neural network models or MLAs to the neural network module 246. In one embodiment, a model stored in the model store 242 comprises weights of the model and instructions associated with the model, for example, instructions for processing an input and generating the output for the model. In some embodiments, one or more non-synthetic 3D objects may be used with a neural network module 246, including but not limited to a GAN-based neural network, to perform training in the training module 244, the resulting learned model being then saved in the model store 242. That stored learned model may have learned hole patterns that exist in the non-synthetic 3D objects, for use to create holes in the sub-module 23323.

In certain non-limiting embodiments while augmenting the 3D objects training dataset, the training dataset augmentation module 230 adds labels to 3D point cloud representations. The labels represent an expected output corresponding to the 3D point cloud representations. For example, the 3D objects training dataset may comprise a set of 3D point cloud representations labelled with the type of a 3D object for training a model for predicting the non-synthetic 3D object.

As previously discussed, each entry in the 3D objects training dataset is used to generate a plurality of entries of the augmented 3D objects training dataset. As a result, a small number of entries (as small as one) in the 3D objects training dataset are used to generate a large number of entries in the augmented 3D objects training dataset. Since generating labelled entries may be an expensive process that may require manual processing, various embodiments of the present technology allow generation of a large number of entries in the augmented 3D objects training dataset from a small number of entries in the 3D objects training dataset thereby making the process of generating labeled training datasets cost effective.

In certain embodiments, one or more 3D point cloud representations corresponding to the 3D object are directly used to train the neural network model and/or MLA. In one non-limiting example, one or more non-synthetic 3D objects accurately recognized by the trained neural network model and/or MLA may be stored in the 3D objects training dataset. In another non-limiting example, even improperly recognized one or more non-synthetic 3D objects may be stored in the 3D objects training dataset provided that a suitable correction to the associated labels has been provided by a user or an expert.

The training module 244 trains one or more neural network models and/or MLAs using the augmented 3D objects training datasets. In certain embodiments, the training module 244 trains the neural network model and/or MLA. In so doing, the training module 244 may assess a 3D point cloud representation associated with a 3D object from the augmented 3D objects training dataset as stored in the training dataset store 220.

By way of non-limiting example, the training module 244 provides an input (e.g., a 3D point cloud representation of the augmented 3D objects training dataset) to the neural network model and/or MLA. The neural network model and/or MLA may generate a corresponding output (e.g., a prediction result of the model). The training module 244 may compare the output of the neural network model and/or MLA with the expected label associated with the input to determine a measure of errors in the output. The errors observed in the outputs of various inputs are fed back into the neural network model and/or MLA to adjust the various weights associated with the nodes and the connections of the neural network model and/or MLA. This process is repeated iteratively until a satisfactory performance is obtained. In one non-limiting example, the process of adjusting the weights associated with the nodes may be repeated iteratively until an aggregate metric based on the error is determined to be below a certain threshold value. While in another non-limiting example, the process of adjusting the weights associated with the nodes may be repeated for a predetermined number of iterations, for example, the first 1000 iterations. The training module 244 repeats the process of training the neural network model through multiple iterations.

It will be appreciated that in case the training module 244 trains a MLA using the augmented 3D objects training dataset then during weighting various features, such that features that are more relevant to the expected label associated with the input tend to have higher weight than features that are less relevant to the expected label. Accordingly, the training dataset augmentation module 230 may generate the augmented 3D objects training dataset for training the MLA.

The neural network module 246 may apply a trained neural network model and/or MLA to process input samples and generates one or more score values. In one embodiment, the trained neural network model and/or MLA is configured to receive a 3D point cloud representation associated with at least one non-synthetic 3D object as input and generate a score for the 3D point cloud representation. In order to generate a score for the 3D point cloud representation, the neural network module 246 may segment the 3D point cloud representation associated with at least one non-synthetic 3D object to generate a bounding box around at least one non-synthetic 3D object and classify at least one non-synthetic 3D object based at least in part on the 3D objects training dataset. For example, the neural network module 246 may classify whether the 3D point clouds in the bounding box includes a particular type of object such as a mechanical component on an assembly line.

In certain embodiments, the trained neural network and/or MLA may determine various attributes of the non-synthetic 3D object recognized in the 3D point cloud representation. Examples of attributes of the non-synthetic 3D object that a trained neural network and/or MLA may recognize include a portion of the non-synthetic 3D object, a size of the non-synthetic 3D object, a category of a target object, or the like or some combination thereof. Certain non-limiting examples of the non-synthetic 3D object may be any real-world objects such as a computer screen, a table, a chair, a coffee mug, a mechanical component on an assembly line, any type of inanimate object or even any type of animal, a plant. The trained neural network model and/or MLA generate an output indicating the classifications of the at least one of the closest non-synthetic 3D object in the 3D point cloud representation.

Further, in certain embodiments, the training module 244 further comprises applying a loopback routine to further train the neural network and/or MLA based on the classification of at least one non-synthetic 3D object. As such, the loopback routine may comprise controlling the applying of the augmentation of the 3D point cloud representation based on the non-synthetic 3D object. For example, in certain situations the non-synthetic 3D object may not be completely visible and hence the 3D point cloud representation of such non-synthetic 3D object may have some missing points. In order to further properly training the neural network and/or MLA, in certain embodiments, the loopback routine may control the removal of 3D points in the 3D point cloud representation of 3D objects used to augment the 3D objects training dataset. While in other embodiments, the loopback routine may change the size or position of the random holes created in the 3D point cloud representation 300. Such removal of 3D points, changing size of the random holes, and/or changing position of the random holes and/or changing a 3D points density of the random holes may be based on a missing portion of the non-synthetic 3D object.

In certain embodiments, the loopback routine may further be utilized to control the operation of the parameter generator 234 to generate specific parameters in contrast to random parameters 235, 236 and 237. For example, the specific parameter associated with noise generator 231 may be based on distance between various 3D models associated with the same object in terms of amplitude of noise/jittering. In another example, the specific parameter associated with one of the geometric transformations provided by the geometric transformer 232, such as applying the rotation may now be applied in a specific manner rather than in a random manner. For different types of geometric transformations, the specific parameters may have different values. In another example, the specific parameter associated with the degradation module 233, such as removing 3D points, may be based on the missing portion of the non-synthetic 3D object. In another example, the specific parameters associated with the non-rigid transformer module 2321 may be based on multiplying Euler angles rotations rather than applying random rotations. Doing so, higher angles would be more transformed than flat articulations. In another example, fragments may be generated not only randomly, but in specific angles of view that generates more 3D vertices in the fragment; in this case, a threshold defining the minimal number of 3D vertices in the fragment may be defined and used in parameter generator 234, this threshold being in some embodiments calculated as a portion of the initial number of 3D vertices in the 3D model to transform.

Figure 24:
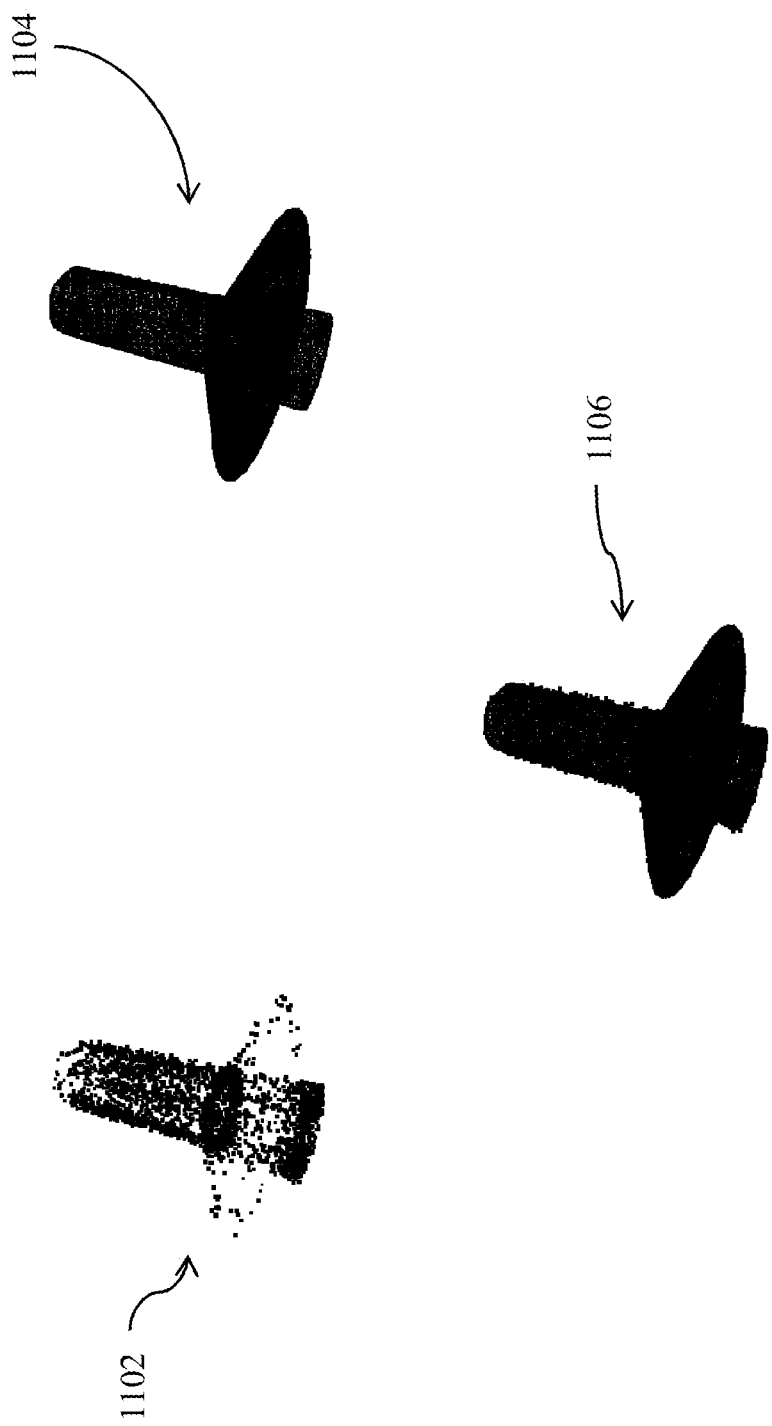

FIGS. 24-27 illustrate a non-limiting example of loopback routine associated with the degradation module 233, in accordance with various embodiments of the present disclosure. As shown in FIG. 24, a 3D point cloud representation 1102 reconstructed from a non-synthetic 3D object (which is subject to recognition). The MLA module 240 (as shown in FIG. 2) may be configured to access the training dataset store 220 (as shown in FIG. 2) to extract the 3D point cloud representation 1104 that may be closest to the 3D point cloud representation 1102. The MLA module 240 may project the 3D point cloud representation 1102 over the 3D point cloud representation 1104 resulting in a 3D point cloud representation 1106.

Figure 25:
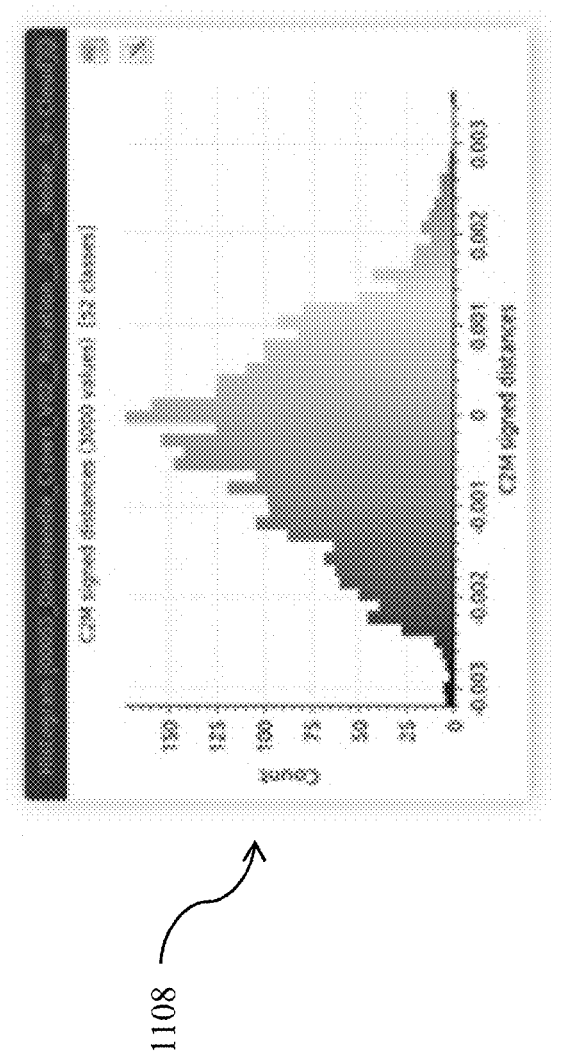
Figure 27:
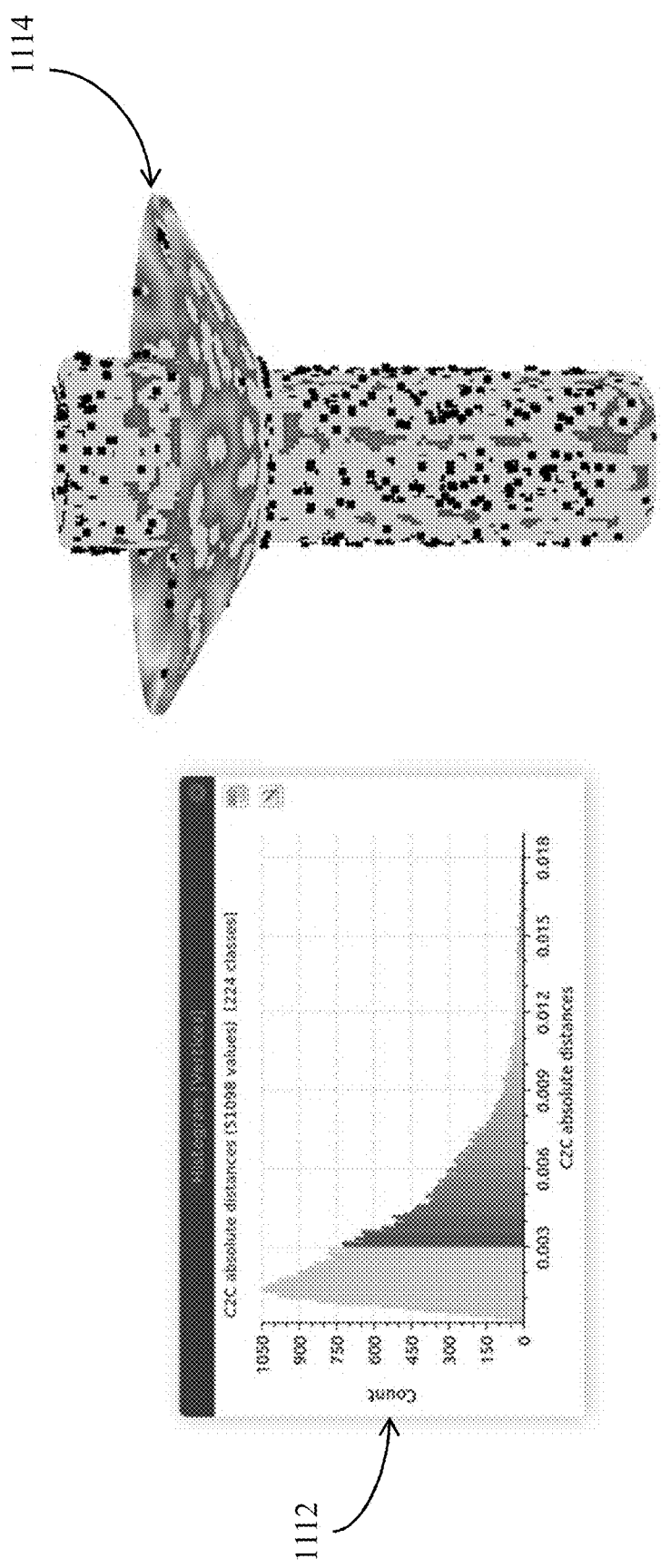

The MLA module 240 may compute signed distances between 3D points (vertices) associated with the project the 3D point cloud representation 1102 and the 3D point cloud representation 1104. The MLA module 240 may provide the signed distances to the training dataset augmentation module 230 (as shown in FIG. 2) to remove certain 3D points (vertices) having a distance above certain value from the 3D point cloud representation 1104. FIG. 25 illustrates a histogram of signed distances versus the number of 3D points (vertices) at particular distances. FIG. 26 illustrates top view and side view of 3D point cloud representation 1110. The 3D point cloud representation 1110 illustrates the 3D points (vertices) to be removed from the 3D point cloud representation 1104 based on signed distance values. FIG. 27 illustrates a histogram 1112 of absolute distances versus the number of 3D points (vertices) at absolute distances. The degradation module 233 associated with the training dataset augmentation module 230 may be configured to remove 3D points in the 3D point cloud representation 1104 and may store the updated 3D point cloud in the training dataset store 220. The 3D point cloud representation 1114 illustrates the degraded the 3D point cloud representation 1104.

Figure 28:
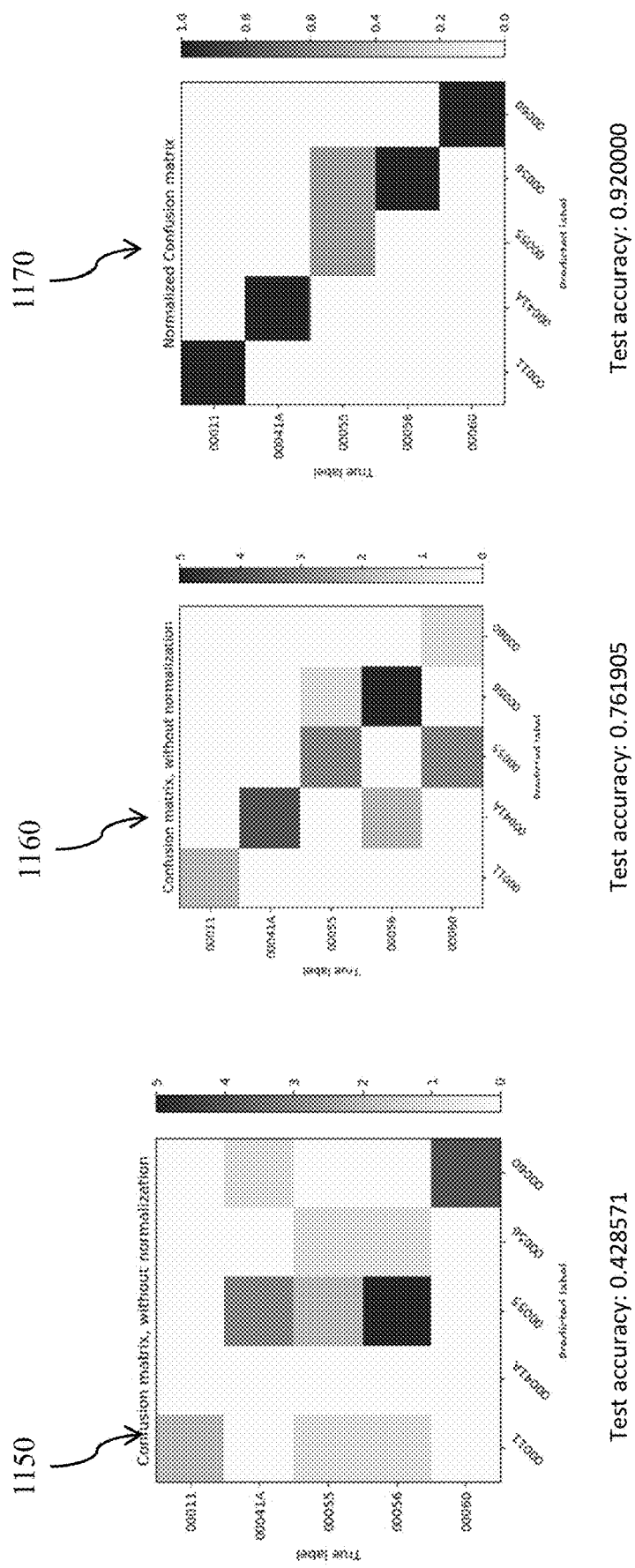
FIG. 28 illustrates experimental outcomes of performance of augmented 3D objects training dataset, in accordance with various embodiments of present technology.

Further, it will be appreciated by virtue of experimentation that incorporating the augmentation of the 3D point cloud representation 300 in the augmentation routine has various benefits while augmenting the 3D objects training dataset. In particular, FIG. 28 illustrates experimental outcomes of performance of augmented 3D objects training dataset, in accordance with various embodiments of present technology. The experimental outcomes are represented in terms of confusion matrices 1150, 1160, and 1170.

The confusion matrix 1150 is associated with the performance of augmented 3D objects training dataset when the augmentation routine associated with the augmentation module 230 includes perturbed rotations (i.e., the 3D point cloud representation is rotated in both the azimuth, elevation and roll coordinates), a shifting operation based on bounding boxes has been utilized, degradation is based on partial-removal of 3D points on any axis or a combination of the axis. The accuracy achieved in this case was approximately 42.8%.

The confusion matrix 1160 is associated with the performance of augmented 3D objects training dataset when the augmentation routine associated with the augmentation module 230 includes generation of noise and geometric transformation similar to those with confusion matrix 1150 except for scaling. However, partial-removal of 3D points has been replaced by random holes creation. The accuracy achieved in this case was approximately 76.2%.

The confusion matrix 1170 is associated with the performance of augmented 3D objects training dataset when the augmentation routine associated with the augmentation module 230 includes adjusting the shifting parameters and making the created holes bigger and occlude some of the holes. The accuracy achieved in this case was approximately 92%.

Figure 29:
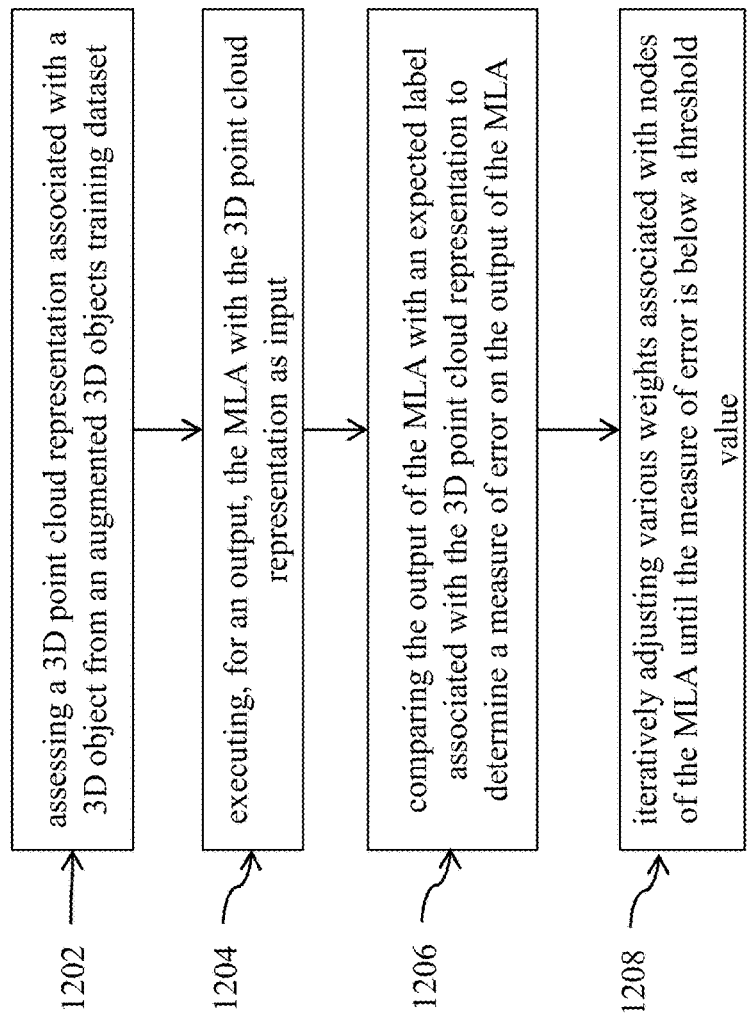
FIG. 29 is an illustration of a method carried out in accordance with non-limiting embodiments of the present technology.

Referring now to FIG. 29 illustrating a computer-implemented method used in connection with training a MLA shall now be discussed. More specifically, FIG. 29 shows flowcharts illustrating a computer-implemented method 1200 implementing embodiments of the present technology. The computer-implemented method of FIG. 29 may comprise a computer-implemented method executable by the computing architecture 200. The computer-implemented method of FIG. 29 may be carried out, for example, by a processor executing program instructions having been loaded, for example, into random access memories.

The method 1200 begins at operation 1202 where the training module 244 assessing a 3D point cloud representation associated with a 3D object from the augmented 3D objects training dataset stored in the training dataset 220. It will be appreciated that the augmented 3D objects training dataset is generated as previously discussed in the current disclosure. The method 1200 proceeds at operation 1204. At operation 1204, the training module 244 may execute an MLA as provided by the model store 242. Input to the MLA being the 3D point cloud representation and execution of the MLA provide an output.

The method 1200 advances to operation 1204. At operation 1204, the training module 244 compares the output of the MLA with an expected label associated with the 3D point cloud representation to determine a measure of errors on the output of the MLA. Finally, at operation 1208, the training module 244 iteratively adjusts various weights associated with nodes of the MLA.

In certain non-limiting operations the weights associated with nodes of the MLA are adjusted until the measure of error is below a threshold value. In certain non-limiting operations, the weights associated with nodes of the MLA are adjusted for a predetermined number of iterations.

Notably, the features and examples above are not meant to limit the scope of the present disclosure to a single embodiment, as other embodiments are possible by way of interchange of some or all of the described or illustrated elements. Moreover, where certain elements of the present disclosure may be partially or fully implemented using known components, only those portions of such known components that are necessary for an understanding of the present disclosure are described, and detailed descriptions of other portions of such known components are omitted so as not to obscure the disclosure. In the present disclosure, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific embodiments so fully reveals the general nature of the disclosure that others may, by applying knowledge within the skill of the relevant art(s) (including the contents of the documents cited and incorporated by reference herein), readily modify and/or adapt for various applications such specific embodiments, without undue experimentation and without departing from the general concept of the present disclosure. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While the above-described implementations have been described and shown with reference to particular operations performed in a particular order, it will be understood that these operations may be combined, sub-divided, or re-ordered without departing from the teachings of the present technology. The operations may be executed in parallel or in series. Accordingly, the order and grouping of the operations is not a limitation of the present technology.

While various embodiments of the present disclosure have been described above, it should be understood that they have been presented by way of example, and not limitations. It would be apparent to one skilled in the relevant art(s) that various changes in form and detail could be made therein without departing from the spirit and scope of the disclosure. Thus, the present disclosure should not be limited by any of the above-described representative embodiments, but should be defined only in accordance with the following claims and their equivalents.

What is claimed is:

1. A method of augmenting a three-dimensional (3D) objects training dataset, the method comprising:
    accessing a 3D point cloud representation of a 3D object;
    applying an augmentation routine on the 3D point cloud to generate an augmented 3D point cloud, the augmentation routine comprising:
        randomly selecting an execution order of at least one of (i) adding a noise to the 3D point cloud, (ii) applying a geometric transformation on the 3D point cloud and (iii) applying a degradation on the 3D point cloud, wherein applying the geometric transformation on the 3D point cloud comprises an operation selected from: changing a size of the 3D point cloud, applying a rotation to the 3D point cloud, applying shifting and/or translating to the 3D point cloud, applying a rotation to articulations of the 3D point cloud, applying a scale-agnostic transformation matrix operations to the 3D point cloud, applying a reflection to the 3D point cloud, or applying a tessellation to the 3D point cloud, and
        applying the randomly selected execution order on the 3D point cloud, thereby generating the augmented 3D point cloud; and
    adding the augmented 3D point cloud to the 3D objects training dataset.

2. The method of claim 1, wherein accessing the 3D point cloud representation of the 3D object comprises generating the 3D point cloud representation from a 3D representation of the 3D object.

3. The method of claim 1, wherein the operation (i) comprises constraining the noise so that the perturbation associated with the augmented 3D point cloud is within a finite envelope.

4. The method of claim 1, wherein the at least one of the operations (i) to (iii) are applied based on a random parameter.

5. The method of claim 1, wherein the noise is selected from a White Gaussian noise, a Voroni noise, a Fractal noise, a Salt and Pepper noise, a film grain noise, a fixed-pattern noise, a Perlin noise, a simplex noise, a Poisson noise and a combination thereof.

6. The method of claim 1, wherein the operation (iii) of applying the degradation comprises removing a group of points from the 3D point cloud.

7. The method of claim 6, further comprising creating fragments by removing hidden 3D points considering a given 3D point of view to the 3D point cloud.

8. The method of claim 1, wherein the operation (iii) of applying the degradation comprises creating random holes in the 3D point cloud.

9. The method of claim 8, further comprising changing a size of the random holes in the 3D point cloud.

10. The method of claim 8, further comprising changing a position of the random holes in the 3D point cloud.

11. The method of claim 8, further comprising changing a 3D points density of the random holes in the 3D point cloud.

12. The method of claim 1, wherein the 3D point cloud representation of the 3D object is a first 3D point cloud representation of a first 3D object and the augmented 3D point cloud is a first augmented 3D point cloud, the method further comprising:
    accessing a second 3D point cloud representation of a second 3D object;
    applying the augmentation routine on the second 3D point cloud to generate a second augmented 3D point cloud;
    synthesizing a scene comprising the first augmented 3D point cloud and the second augmented 3D point cloud; and
    adding the synthesized scene to the 3D objects training dataset.

13. The method of claim 1, further comprising training a machine learning algorithm (MLA) based at least in part on the 3D objects training dataset.

14. The method of claim 13, further comprising applying the MLA on non-synthetic data, the non-synthetic data comprising at least one non-synthetic 3D object.

15. The method of claim 14, wherein applying the MLA comprises:
    segmenting the non-synthetic data to generate a boundary box around the at least one non-synthetic 3D object; and
    classifying the at least one non-synthetic 3D object based at least in part on the 3D objects training dataset.

16. The method of claim 15, further comprising applying a loopback routine to further train the MLA based on the classification of the at least one non-synthetic 3D object.

17. The method of claim 16, wherein the loopback routine comprises controlling the operation (iii) of applying the degradation on the 3D point cloud, the controlling being based on the non-synthetic 3D object.

18. The method of claim 17, wherein the controlling is based on a determination of a missing portion of the non-synthetic 3D object.

19. The method of claim 16, wherein the loopback routine is utilized to determine specific parameters according to which the augmentation routine is applied.

20. A method of training a machine learning algorithm (MLA), the method comprising:

accessing an augmented 3D point cloud representation associated with a 3D object from an augmented 3D objects training dataset, wherein:
  the augmented 3D objects training dataset has been generated by:
    accessing a 3D point cloud representation of the 3D object;
    applying an augmentation routine on the 3D point cloud to generate the augmented 3D point cloud, the augmentation routine comprising:
      randomly selecting an execution order of at least one of (i) adding a noise to the 3D point cloud, (ii) applying a geometric transformation on the 3D point cloud or (iii) applying a degradation on the 3D point cloud;
      applying the randomly selected execution order of (i) to (iii) on the 3D point cloud; and
    adding the augmented 3D point cloud to the augmented 3D objects training dataset;
inputting the augmented 3D point cloud representation to the MLA to generate an output;
comparing the output of the MLA with an expected label associated with the 3D point cloud representation to determine a measure of error on the output of the MLA; and
iteratively adjusting various weights associated with nodes of the MLA.

21. The method of claim 20, wherein the weights associated with nodes of the MLA are adjusted until the measure of error is below a threshold value.

22. The method of claim 20, wherein the weights associated with nodes of the MLA are adjusted for a predetermined number of iterations.

23. A system comprising:
at least one processor and memory comprising executable instructions, which, when executed by the at least one processor, cause the system to:
access an augmented 3D point cloud representation associated with a 3D object from an augmented 3D objects training dataset, wherein:
  the augmented 3D objects training dataset has been generated by:
    accessing a 3D point cloud representation of the 3D object;
    applying an augmentation routine on the 3D point cloud to generate the augmented 3D point cloud, the augmentation routine comprising:
      randomly selecting an execution order of at least one of (i) adding a noise to the 3D point cloud, (ii) applying a geometric transformation on the 3D point cloud or (iii) applying a degradation on the 3D point cloud;
      applying the randomly selected execution order of (i) to (iii) on the 3D point cloud; and
    adding the augmented 3D point cloud to the augmented 3D objects training dataset;
input the augmented 3D point cloud representation to a machine learning algorithm (MLA) to generate an output;
compare the output of the MLA with an expected label associated with the 3D point cloud representation to determine a measure of error on the output of the MLA; and
iteratively adjust various weights associated with nodes of the MLA.

* * * * *